US012658108B2

(12) United States Patent
Xie

(10) Patent No.: US 12,658,108 B2
(45) Date of Patent: Jun. 16, 2026

(54) DISPLAY PANEL AND DISPLAY APPARATUS

(71) Applicant: Tianma Advanced Display Technology Institute (Xiamen) Co., Ltd., Xiamen (CN)

(72) Inventor: Mengmeng Xie, Xiamen (CN)

(73) Assignee: Tianma Advanced Display Technology Institute (Xiamen) Co., Ltd., Xiamen (CN)

( * ) Notice: Subject to any disclaimer, the term of this patent is extended or adjusted under 35 U.S.C. 154(b) by 36 days.

(21) Appl. No.: 18/792,600

(22) Filed: Aug. 2, 2024

(65) Prior Publication Data

US 2024/0395194 A1 Nov. 28, 2024

(30) Foreign Application Priority Data

May 28, 2024 (CN) ........................ 202410672233.X

(51) Int. Cl.
*G09G 3/32* (2016.01)

(52) U.S. Cl.
CPC ........... *G09G 3/32* (2013.01); *G09G 2310/08* (2013.01); *G09G 2320/0233* (2013.01)

(58) Field of Classification Search
CPC .... G09G 3/3233; G09G 3/32; G09G 2320/02; G09G 2310/08; G09G 2320/0626; G09G 2320/0233; G09G 2320/064
See application file for complete search history.

(56) References Cited

U.S. PATENT DOCUMENTS

2014/0299843 A1* 10/2014 Kim ..................... H10D 86/441 438/23
2022/0367586 A1* 11/2022 Choi ..................... H10D 86/451
2023/0238496 A1* 7/2023 Bok ..................... H10H 20/8316 257/79

FOREIGN PATENT DOCUMENTS

| | | |
|---|---|---|
| CN | 107170407 A | 9/2017 |
| CN | 215731718 U | 2/2022 |
| CN | 114267283 A | 4/2022 |

OTHER PUBLICATIONS

Chinese Office Action mailed Sep. 5, 2025, issued in related Chinese Application No. 202410672233.X, 19 pages.

* cited by examiner

*Primary Examiner* — Muhammad N Edun
(74) *Attorney, Agent, or Firm* — Wiersch Law Group

(57) ABSTRACT

Display panel and display apparatus are provided. Display panel includes pixel circuits and light-emitting devices. Pixel circuits includes drive transistor, first light-emitting control module, and second light-emitting control module. One of first light-emitting control module and second light-emitting control module is connected between first power terminal and first electrode of drive transistor, the other is connected between second electrode of drive transistor and light-emitting device. At least one of first light-emitting control module and second light-emitting control module in first pixel circuit is connected to drive transistor through bridge line. At least one of first light-emitting control module and second light-emitting control module in second pixel circuit is directly connected to drive transistor. By reasonably arranging two light-emitting control modules in pixel circuits, the disclosure can make light-emitting control modules in two pixel circuits receive control signal in different manners, and meet requirements on line connection in pixel circuits.

20 Claims, 32 Drawing Sheets

DISPLAY PANEL AND DISPLAY APPARATUS

CROSS-REFERENCE TO RELATED APPLICATIONS

The present application claims priority to Chinese Patent Application CN 202410672233.X, filed on May 28, 2024, the content of which is incorporated herein by reference in its entirety.

TECHNICAL FIELD

The present disclosure relates to the field of display technologies, and in particular to a display panel and a display apparatus.

BACKGROUND

Micro light-emitting diodes (Micro LEDs) and Mini light-emitting diodes (Mini LEDs) will become mainstream technologies to future display products for high luminous efficiency, high luminance, wide color gamut (WCG) and low power consumption. To realize color display, a red LED, a green LED and a blue LED are to be used. Since devices displaying different colors are varied in luminous efficiency, the structure of a pixel circuit for driving the LEDs is of great importance to the display effect.

SUMMARY

Embodiments of the present disclosure provide a display panel and a display apparatus.

According to a first aspect, an embodiment of the present disclosure provides a display panel. The display panel includes a plurality of pixel circuits and a plurality of light-emitting devices. The pixel circuits each include a drive transistor, a first light-emitting control module, and a second light-emitting control module. One of the first light-emitting control module and the second light-emitting control module is connected between a first power terminal and a first electrode of the drive transistor, and the other of the first light-emitting control module and the second light-emitting control module is connected between a second electrode of the drive transistor and the light-emitting device.

The pixel circuits include a first pixel circuit and a second pixel circuit. The display panel includes a bridge line.

At least one of the first light-emitting control module and the second light-emitting control module in the first pixel circuit is connected to the drive transistor through the bridge line. At least one of the first light-emitting control module and the second light-emitting control module in the second pixel circuit is directly connected to the drive transistor.

According to a second aspect, based on a same inventive concept, an embodiment of the present disclosure provides a display apparatus, including a display panel, provides a display panel. The display panel includes a plurality of pixel circuits and a plurality of light-emitting devices. The pixel circuits each include a drive transistor, a first light-emitting control module, and a second light-emitting control module. One of the first light-emitting control module and the second light-emitting control module is connected between a first power terminal and a first electrode of the drive transistor, and the other of the first light-emitting control module and the second light-emitting control module is connected between a second electrode of the drive transistor and the light-emitting device. The pixel circuits include a first pixel circuit and a second pixel circuit. The display panel includes a bridge line. At least one of the first light-emitting control module and the second light-emitting control module in the first pixel circuit is connected to the drive transistor through the bridge line. At least one of the first light-emitting control module and the second light-emitting control module in the second pixel circuit is directly connected to the drive transistor.

BRIEF DESCRIPTION OF DRAWINGS

To describe the technical solutions in the embodiments of the present disclosure or in the prior art more clearly, the following briefly describes the accompanying drawings required for describing the embodiments or the prior art. Apparently, the accompanying drawings in the following description show some embodiments of the present disclosure, and a person skilled in the art may still derive other drawings from these accompanying drawings without creative efforts.

DESCRIPTION OF EMBODIMENTS

To make the objectives, technical solutions, and advantages of the embodiments of the present disclosure clearer, the technical solutions in the embodiments of the present disclosure will be clearly and completely described below with reference to the accompanying drawings in the embodiments of the present disclosure. Apparently, the described embodiments are some rather than all of the embodiments of the present disclosure. All other embodiments obtained by those of ordinary skill in the art based on the embodiments of the present disclosure without creative efforts should fall within the protection scope of the present disclosure.

Terms used in the embodiments of the present disclosure are only for the purpose of describing specific embodiments, and are not intended to limit the present disclosure. Unless otherwise specified in the context, words, such as “a”, “the”, and “this”, in a singular form in the embodiments of the present disclosure and the appended claims include plural forms.

LEDs of different colors are made of different light-emitting materials. Affected by the light-emitting materials, the LEDs of different colors are varied in luminous efficiency. Moreover, the light-emitting materials of the LEDs are affected by a temperature largely. At different temperatures, the luminous efficiency of the LEDs is different. The temperature poses different influences on the luminous efficiency of the LEDs of different colors, thereby causing color shift in display. For example, by testing, compared with a working environment at 25° C., when the display panel works at a high temperature (such as 85° C.), luminous efficiency of a red LED, a green LED and a blue LED is reduced to different extents. This causes the color shift and luminance drop of the display panel.

In order to solve problems in the related art, an embodiment of the present disclosure provides a display panel. Different layouts are designed for different pixel circuits, such that the different pixel circuits can be driven in different control manners. The present disclosure can make light-emitting devices coupled to the different pixel circuits achieve different light emission durations, thereby compensating differences of the different light-emitting devices in luminous efficiency, and improving a display effect of the display panel.

Figure 1:
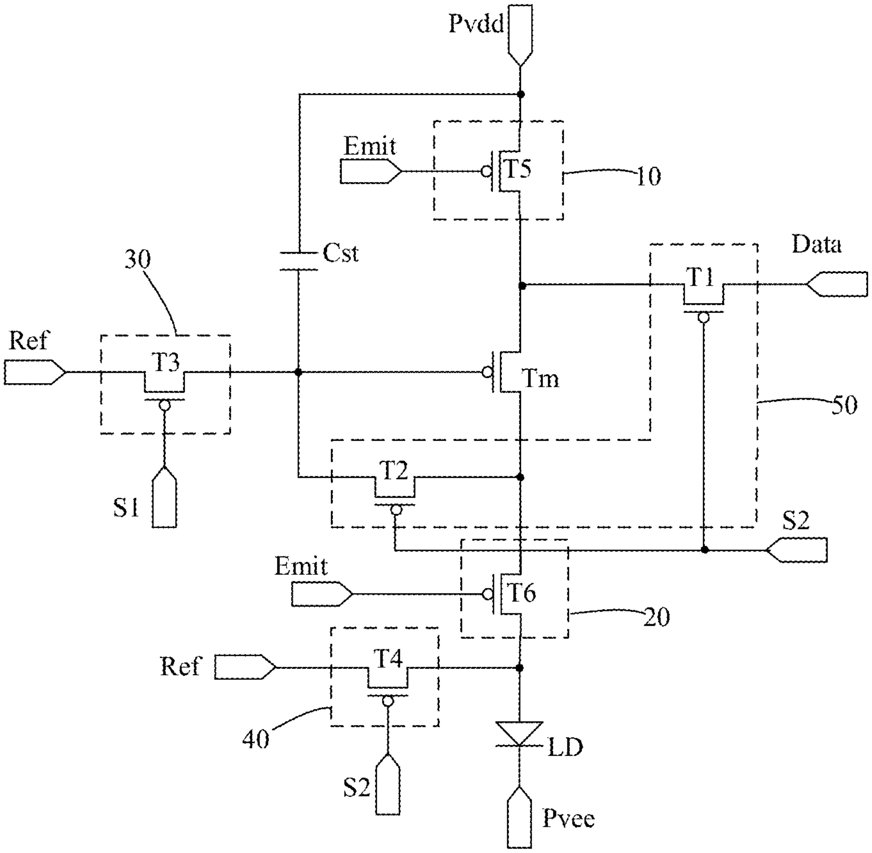
FIG. 1 is a schematic diagram of a pixel circuit according to an embodiment of the present disclosure.
Figure 2:
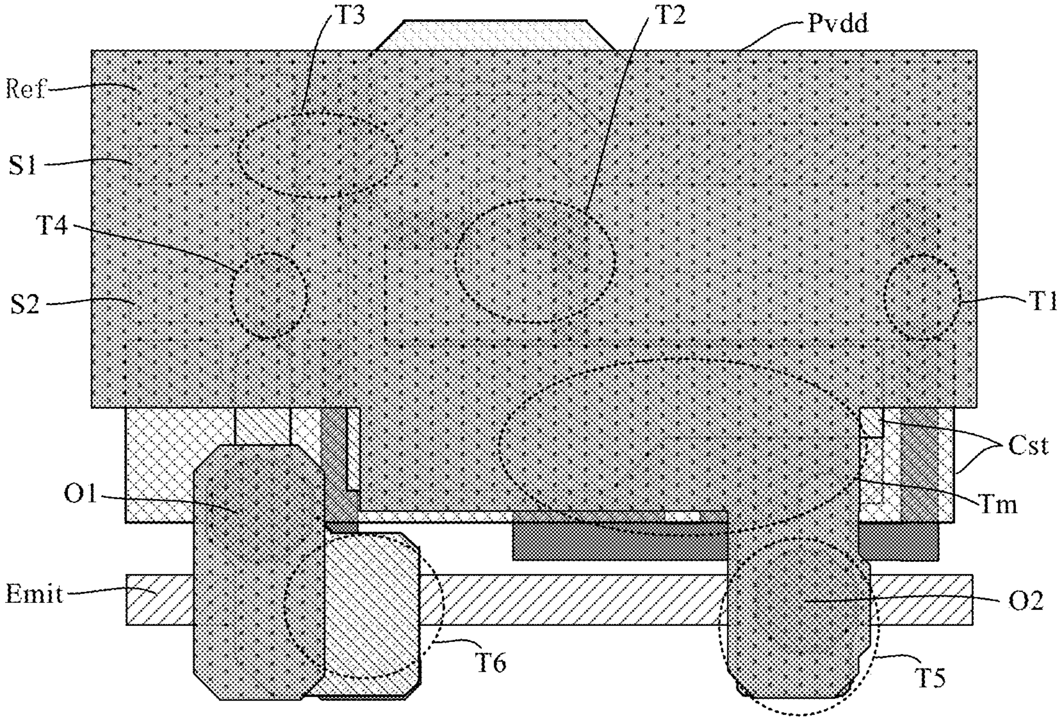
FIG. 2 is a layout of a pixel circuit according to an embodiment of the present disclosure.

FIG. 1 is a schematic diagram of a pixel circuit according to an embodiment of the present disclosure. FIG. 2 is a layout of a pixel circuit according to an embodiment of the present disclosure. As shown in FIG. 1 and FIG. 2, the pixel circuit includes a drive transistor Tm, a first light-emitting control module 10, a second light-emitting control module 20, a gate reset module 30, an electrode reset module 40, a data writing module 50, and a storage capacitor Cst. The drive transistor Tm includes a first electrode coupled to a first power terminal Pvdd through the first light-emitting control module 10, and a second electrode coupled to one electrode of a light-emitting device LD through the second light-emitting control module 20. The other electrode of the light-emitting device LD is coupled to a second power terminal Pvee. The storage capacitor Cst includes one electrode plate coupled to the first power terminal Pvdd, and the other electrode plate coupled to a gate of the drive transistor Tm. As can be seen from FIG. 1, the gate reset module 30 is controlled by a first scanning signal S1, the data writing module 50 and the electrode reset module 40 are controlled by a second scanning signal S2, and the first light-emitting control module 10 and the second light-emitting control module 20 are controlled by a light-emitting control signal Emit. The light-emitting device LD is an LED, such as a Micro LED or a Mini LED. In some implementations, the light-emitting device LD may also be an organic light-emitting diode (OLED). As can be seen from FIG. 2, the first light-emitting control module 10 is directly connected to the first electrode of the drive transistor Tm, and the second light-emitting control module 20 is directly connected to the second electrode of the drive transistor Tm.

Figure 3:
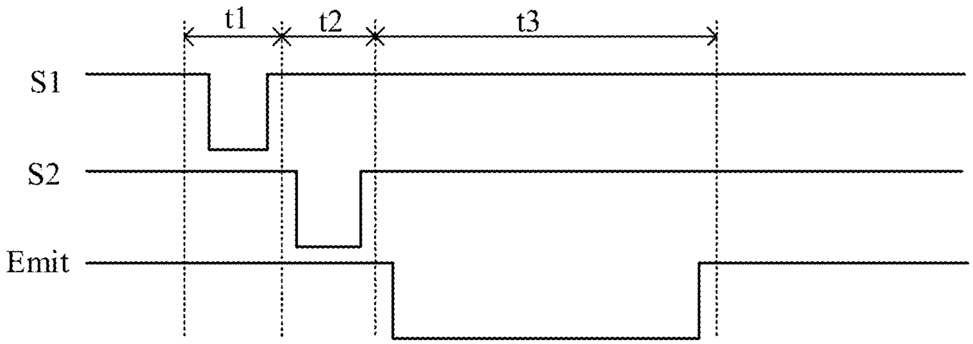
FIG. 3 is a timing diagram of the pixel circuit shown in FIG. 1.

FIG. 3 is a timing diagram of the pixel circuit shown in FIG. 1. As shown in FIG. 3, a working cycle of the pixel circuit includes a gate reset stage t1, a data writing stage t2, and a light-emitting stage t3. In the gate reset stage t1, the gate reset module 30 is turned on to write a reset signal Ref (having a same reference sign as its signal terminal) provided by a reset signal terminal Ref into the gate of the drive transistor Tm, thereby resetting the gate of the drive transistor Tm. In the data writing stage t2, the data writing module 50 is turned on to write a data voltage Data into the gate of the drive transistor Tm, and the electrode reset module 40 is turned on to reset the electrode of the light-emitting device LD with the reset signal Ref. In the light-emitting stage t3, the first light-emitting control module 10 and the second light-emitting control module 20 are turned on, the drive transistor Tm is turned on under the control of a voltage at the gate of the drive transistor, the pixel circuit provides a driving current for the light-emitting device LD, and the light-emitting device LD emits light under the control of a light-emitting current.

In the embodiments of present disclosure, as shown in FIG. 1, the data writing module 50 includes a data writing transistor T1 and a compensation transistor T2. The gate reset module 30 includes a gate reset transistor T3. The electrode reset module 40 includes an electrode reset transistor T4. The first light-emitting control module 10 includes a first light-emitting control transistor T5. The second light-emitting control module 20 includes a second light-emitting control transistor T6. In some implementations, the electrode reset transistor may also not be provided in the pixel circuit.

As shown in FIG. 1, the transistors in the pixel circuit are all p-type transistors. In other implementations, the transistors are all n-type transistors. In other implementations, at least one of the gate reset transistor T3 and the compensation transistor T2 is an n-type transistor, and a remaining transistor is a p-type transistor. For example, an active layer of the at least one of the gate reset transistor T3 and the compensation transistor T2 includes metal oxide, and an active layer of the remaining transistor includes silicon. When the compensation transistor T2 is the n-type transistor, and the data writing transistor T1 is the p-type transistor, it may be understood that both the compensation transistor and the data writing transistor are controlled by different signals. In the accompanying drawings of the following embodiments, the transistors in the pixel circuit are all p-type transistors only for illustration.

Figure 4:
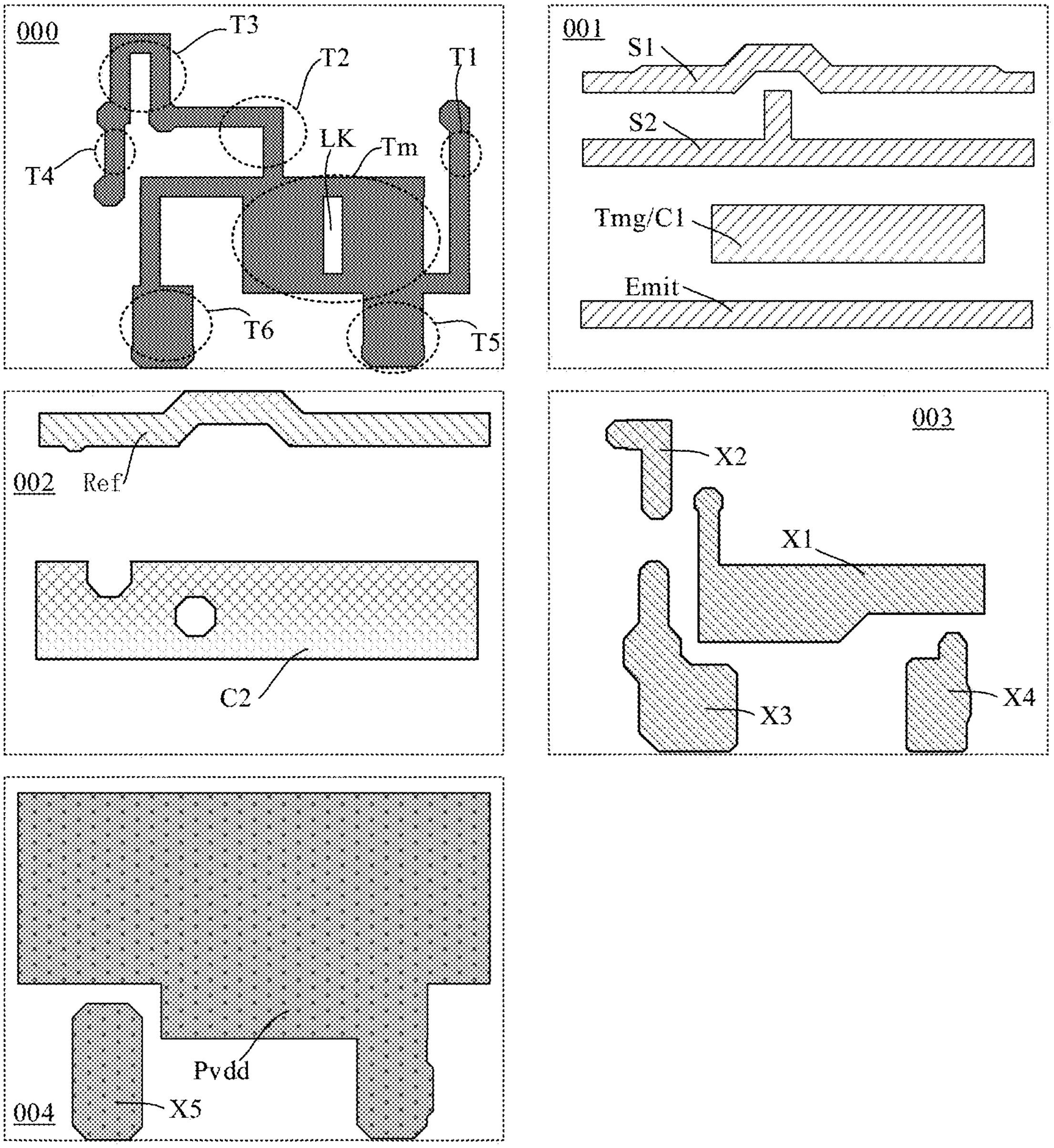
FIG. 4 is an exploded diagram of film layers shown in FIG. 2.

FIG. 4 is an exploded diagram of film layers shown in FIG. 2. Structures in the pixel circuit and film layers of the structures are understood with reference to the circuit diagram in FIG. 1. As shown in FIG. 2 and FIG. 4, a first scanning line S1, a second scanning line S2, a light-emitting control line Emit, and a reset signal line Ref are arranged in the display panel. The first scanning line S1 provides the first scanning signal S1. The second scanning line S2 provides the second scanning signal S2. The light-emitting control line Emit provides the light-emitting control signal Emit. The reset signal line Ref serves as the reset signal terminal Ref, and provides the reset signal.

In the embodiment of the present disclosure, the signal line and the signal provided by the signal line are represented by a same reference sign. For example, the first scanning line and the first scanning signal provided by the first scanning line are represented by S1. The first power terminal and the first power voltage provided by the first power terminal are represented by Pvdd. Reference signals of other signal lines and signal terminals are understood with reference to descriptions herein.

With reference to FIG. 4, the display panel includes at least a semiconductor layer 000, a first metal layer 001, a second metal layer 002, a third metal layer 003, and a fourth metal layer 004 that are located on a substrate. The semiconductor layer 000, the first metal layer 001, the second metal layer 002, the third metal layer 003, and the fourth metal layer 004 are provided sequentially away from the substrate. An active layer of each transistor is located in the semiconductor layer 000. The position of the active layer of each transistor is labeled in the semiconductor layer 000 in FIG. 4. As can be seen from a shape of the active layer at the drive transistor Tm in FIG. 4, the active layer at the drive transistor Tm is provided with a hollow LK. In this way, the semiconductor layer at two sides of the hollow LK serves as the active layer of the transistor, such that the drive transistor Tm is a parallel structure of two transistors in the implementation. There is a kink phenomenon on an output characteristic curve (Id-Vd) of the transistor. That is, the output characteristic curve tends to bend upward. This phenomenon occurs when a leakage voltage is higher than a certain value. In case of an overlarge channel width of the drive transistor, the kink phenomenon affects uniformity of luminance in display. Compared with a solution in which one transistor is manufactured in this region to serve as the drive transistor, the parallel transistor in the embodiment of the present disclosure can ensure that the channel width of the single transistor is not overlarge, and can prevent the kink phenomenon from affecting the uniformity of the luminance. Moreover, the drive transistor Tm composed of the parallel transistor can have a large width-to-length ratio overall to increase the driving current.

The first scanning line S1, the second scanning line S2 and the light-emitting control line Emit are located in the first metal layer 001. A gate of each transistor is located in the first metal layer 001. FIG. 4 illustrates a gate Tmg of the drive transistor Tm. The gate Tmg of the drive transistor Tm is reused as one electrode plate C1 of the storage capacitor Cst. The other electrode plate C2 of the storage capacitor Cst is located in the second metal layer 002. The reset signal line Ref is located in the second metal layer 002. A plurality of connecting lines, such as a first connecting line X1 for connecting the gate reset transistor T3 to the gate Tmg of the drive transistor Tm, a second connecting line X2 for connecting the gate reset transistor T3 to the reset signal line Ref, a third connecting line X3 connected to the second light-emitting control transistor T6, and a fourth connecting line X4 connected to the first light-emitting control transistor T5, are arranged in the third metal layer 003. The first connecting line X1 is provided in a large area, so as to increase a capacitance of the storage capacitor. The third connecting line X3 is electrically connected to a connection electrode X5 through a first via hole O1 (the via hole refers to a hole penetrating through an insulation layer). The connection electrode X5 is connected to the light-emitting device LD. Through the third connection electrode X3, the second light-emitting control transistor T6 is coupled to the light-emitting device. The fourth connecting line X4 is connected to the first power terminal Pvdd through a second via hole O2. The first power terminal Pvdd and the connection electrode X5 are located in the fourth metal layer 004.

As can be seen from FIG. 1 and FIG. 2, the pixel circuit provided by the embodiment of the present disclosure is provided with two light-emitting control modules. One of the two light-emitting control modules is connected between the first power terminal Pvdd and the first electrode of the drive transistor Tm, and the other of the two second light-emitting control modules is connected between the second electrode of the drive transistor Tm and the light-emitting device LD. Different names of the two light-emitting control modules are merely intended to describe and understand the structure of the pixel circuit. As a matter of fact, the names of the first light-emitting control module 10 and the second light-emitting control module 20 can be interchangeable. That is, the first light-emitting control module 10 is connected between the second electrode of the drive transistor Tm and the light-emitting device LD, and the second light-emitting control module 20 is connected between the first power terminal Pvdd and the first electrode of the drive transistor Tm.

FIG. 2 illustrates a structure of the layout of the pixel circuit. In the embodiment of FIG. 2, the first light-emitting control module 10 and the second light-emitting control module 20 are located at a same side of the drive transistor Tm, the first light-emitting control module 10 is directly connected to the first electrode of the drive transistor Tm, and the second light-emitting control module 20 is directly connected to the second electrode of the drive transistor Tm. With reference to the timing diagram in FIG. 3, in the light-emitting stage t3, when the first light-emitting control module 10 and the second light-emitting control module 20 are turned on, a light emission channel formed by the first light-emitting control module 10, the drive transistor Tm and the second light-emitting control module 20 is connected, such that the pixel circuit provides a driving current for the light-emitting device LD. That is, an on-off state of the first light-emitting control module 10 and/or the second light-emitting control module 20 affects a duration for providing the driving current. In the embodiment of the present disclosure, the first light-emitting control module 10 and/or the second light-emitting control module 20 and the drive transistor Tm are connected in different manners in different pixel circuits, such that light emission channels in the different pixel circuits are connected for different durations, and the different pixel circuits provides the driving current for different durations.

In a further embodiment of the present disclosure, the first light-emitting control module 10 and/or the second light-emitting control module 20 and the drive transistor Tm are connected in different manners in different pixel circuits, and a bridge line is provided in the display panel. At least one of the first light-emitting control module 10 and the second light-emitting control module 20 in the first pixel circuit is connected to the drive transistor Tm through the bridge line. At least one of the first light-emitting control module 10 and the second light-emitting control module 20 in the second pixel circuit is directly connected to the drive transistor Tm. This includes at least the following technical solutions:

First technical solution: In the first pixel circuit, one of the two light-emitting control modules is connected to the drive transistor Tm through the bridge line, and the other of the two light-emitting control modules is directly connected to the drive transistor Tm. In the second pixel circuit, the two light-emitting control modules are directly connected to the drive transistor Tm.

Second technical solution: In the first pixel circuit, the two light-emitting control modules are connected to the drive transistor Tm through the bridge line. In the second pixel circuit, one of the two light-emitting control modules is connected to the drive transistor Tm through the bridge line, and the other of the two light-emitting control modules is directly connected to the drive transistor Tm.

Third technical solution: In the first pixel circuit, the two light-emitting control modules are connected to the drive transistor Tm through the bridge line. In the second pixel circuit, the two light-emitting control modules are directly connected to the drive transistor Tm.

It is to be noted that the first electrode and the second electrode of the drive transistor Tm in the pixel circuit are located in the semiconductor layer 000. The term "directly connected" herein refers to that one electrode of the light-emitting control module is also located in the semiconductor layer 000 to directly connect the light-emitting control module to the drive transistor Tm. For example, the first light-emitting control module 10 is directly connected to the first electrode of the drive transistor Tm. The first light-emitting control module 10 includes the first light-emitting control transistor T5. A second electrode of the first light-emitting control transistor T5 and the first electrode of the drive transistor Tm are located in the semiconductor layer 000. The second electrode of the first light-emitting control transistor T5 is directly connected to the first electrode of the drive transistor Tm. Alternatively, the second electrode of the first light-emitting control transistor T5 and the first electrode of the drive transistor Tm are a continuous structure (or an integrated structure).

The first light-emitting control module 10, the drive transistor Tm and the second light-emitting control module 20 in the pixel circuit form the light emission channel. The on-off state of the first light-emitting control module 10 and/or the second light-emitting control module 20 affects a duration when the light emission channel is connected, thereby affecting the duration for providing the driving current. In the embodiment of the present disclosure, by connecting the two light-emitting control modules and the drive transistor in the first pixel circuit and the second pixel circuit in different manners, and reasonably arranging the two light-emitting control modules in the pixel circuits, the light-emitting control modules in the two pixel circuits can receive a control signal in different manners, and requirements on line connection in the pixel circuits are met. The first pixel circuit and the second pixel circuit are driven in different control manners, such that a light emission channel in the first pixel circuit and a light emission channel in the second pixel circuit are connected for different durations, and different pixel circuits provide a driving current for light-emitting devices in a light-emitting stage for different durations. Therefore, the present disclosure makes the light-emitting devices driven by the different pixel circuit achieve different light emission durations, thereby compensating differences of the light-emitting devices in luminous efficiency, and improving the display effect.

The above solutions are described in detail below with reference to specific embodiments.

In the embodiment of the present disclosure, the pixel circuit includes two light-emitting control modules, namely the first light-emitting control module 10 and the second light-emitting control module 20. In the embodiments of present disclosure, the first light-emitting control module 10 includes the first light-emitting control transistor T5, and the second light-emitting control module 20 includes the second light-emitting control transistor T6. In the following embodiments, that the pixel circuit includes the first light-emitting control module 10 and the second light-emitting control module 20 is described in embodiments involving the circuit diagram of the pixel circuit, and is shown in related accompanying drawings. In embodiments involving the layout of the pixel circuit in the display panel, the first light-emitting control transistor T5 and the second light-emitting control transistor T6 are directly shown in the layout. That is, in the layout, the first light-emitting control transistor T5 is the first light-emitting control module 10, and the second light-emitting control transistor T6 is the second light-emitting control module 20 for illustration.

Figure 5:
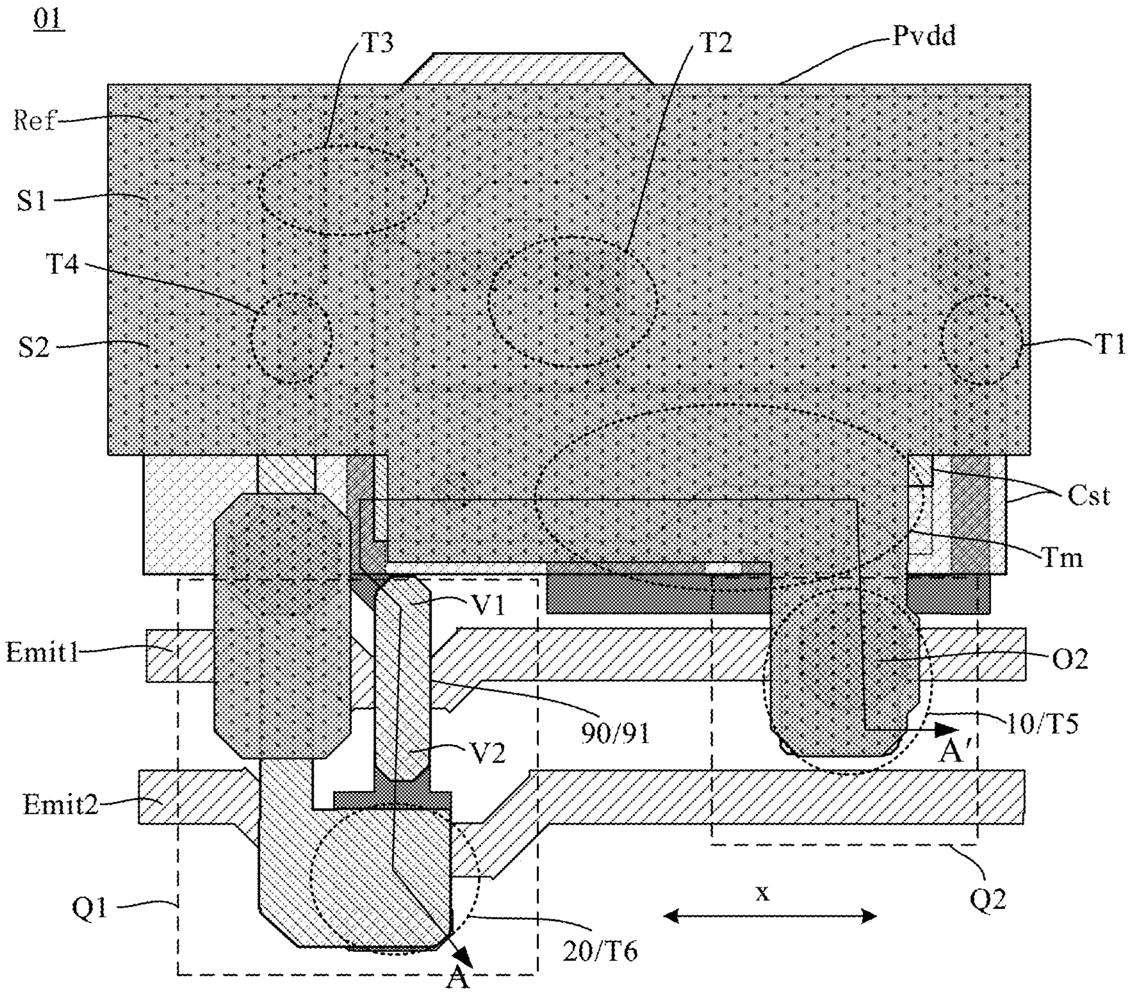
FIG. 5 is a schematic diagram of a display panel according to an embodiment of the present disclosure.
Figure 6:
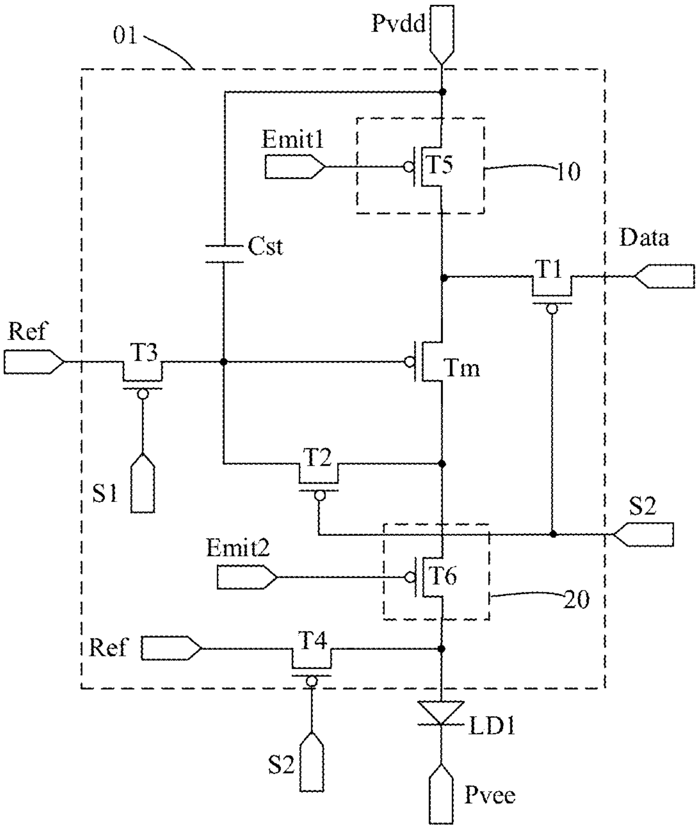
FIG. 6 is a schematic diagram of another pixel circuit according to an embodiment of the present disclosure.
Figure 7:
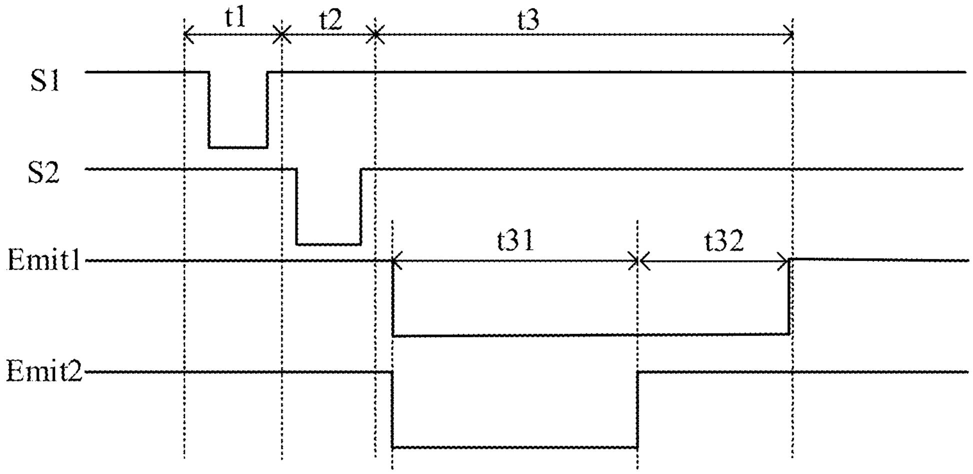
FIG. 7 is a signal timing diagram according to an embodiment of the present disclosure.
Figure 8:
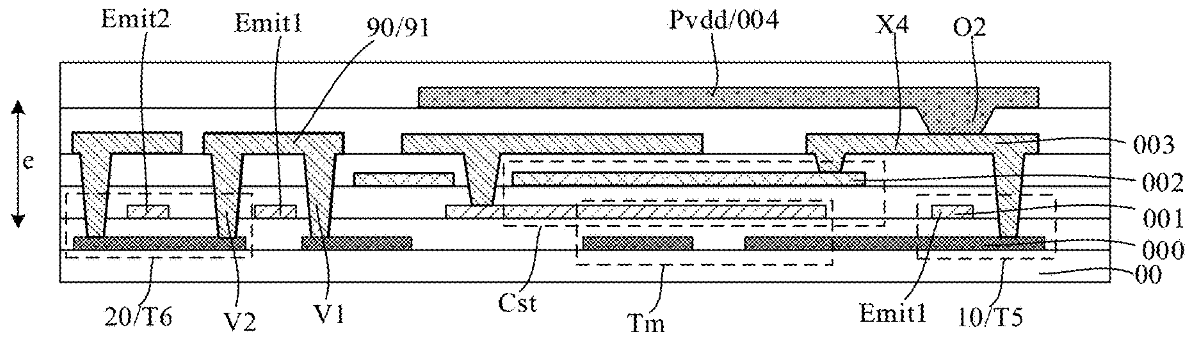
FIG. 8 is a schematic cross-sectional view along a line A-A' shown in FIG. 5.

In some implementations, FIG. 5 is a schematic diagram of a display panel according to an embodiment of the present disclosure. FIG. 6 is a schematic diagram of another pixel circuit according to an embodiment of the present disclosure. FIG. 7 is a signal timing diagram according to an embodiment of the present disclosure. FIG. 8 is a schematic cross-sectional view along a line A-A' shown in FIG. 5. FIG. 5 illustrates a region of one first pixel circuit 01. FIG. 6 is a schematic diagram of the pixel circuit corresponding to the layout shown in FIG. 5.

With reference to FIG. 5 and FIG. 6, in the first pixel circuit 01, a control terminal of the first light-emitting control module 10 receives a first control signal Emit1, a control terminal of the second light-emitting control module 20 receives a second control signal Emit2, and an effective pulse width of the first control signal Emit1 is different from an effective pulse width of the second control signal Emit2. The effective pulse width refers to a width (or time) of an effective pulse, and may also be called a duration of the effective pulse. For example, with a low level as an effective level, a low level pulse is the effective pulse. As can be seen from FIG. 5, the first light-emitting control module 10 includes the first light-emitting control transistor T5, and the second light-emitting control module 20 includes the second light-emitting control transistor T6. In the first pixel circuit 01, the first light-emitting control transistor T5 is directly connected to the drive transistor Tm, and the second light-emitting control transistor T6 is connected to the drive transistor Tm through the bridge line 90. As shown in FIG. 6, the first pixel circuit 01 is coupled to a first light-emitting device LD1.

With reference to FIG. 7, that the low level signal is the effective pulse signal, and the effective pulse width of the first control signal Emit1 is greater than the effective pulse width of the second control signal Emit2 is used as an example to describe a working cycle of the first pixel circuit

01. The working cycle of the first pixel circuit 01 includes a gate reset stage t1, a data writing stage t2, and a light-emitting stage t3. In the working cycle of the first pixel circuit 01, an effective pulse period of the second control signal Emit2 overlaps with an effective pulse period of the first control signal Emit1. The term "period overlap" is understood as that both the second control signal Emit2 and the first control signal Emit1 provide the effective pulse in a same period. In FIG. 7, the effective pulse width of the first control signal Emit1 is greater than the effective pulse width of the second control signal Emit2, and in at least one of periods when the first control signal Emit1 provides the effective pulse, the second control signal Emit2 provides the effective pulse. In other solutions in which the effective pulse width of the first control signal Emit1 is less than the effective pulse width of the second control signal Emit2, the effective pulse period of the second control signal Emit2 overlaps with the effective pulse period of the first control signal Emit1, and in at least one of periods when the second control signal Emit2 provides the effective pulse, the first control signal Emit1 provides the effective pulse.

In the light-emitting stage t3 of the first pixel circuit 01, the effective pulse of the first control signal Emit1 overlaps with the effective pulse of the second control signal Emit2 in a period t31. In a period t32, the first control signal Emit1 is an effective level, and the second control signal Emit2 is a non-effective level. In the period t31, both the first light-emitting control module 10 and the second light-emitting control module 20 in the first pixel circuit 01 are turned on, and the first pixel circuit 01 provides a driving current for the first light-emitting device LD1 to emit light. In the period t32, since the second control signal Emit2 is the non-effective level, the second light-emitting control module 20 is turned off, and the first pixel circuit 01 cannot provide a driving current. The effective pulse width of the first control signal Emit1 is different from the effective pulse width of the second control signal Emit2, so a duration when the first pixel circuit 01 provides the driving current is associated with an overlap period for the effective pulses of the two control signals, thereby adjusting a light emission duration of the first light-emitting device LD1 driven by the first pixel circuit 01. For the layout of the pixel circuit in FIG. 2, since the two light-emitting control modules are directly connected to the drive transistor Tm in the layout of FIG. 2, the control terminals of the two light-emitting control modules receive a same signal. In the embodiment of the present disclosure, in the first pixel circuit 01, one of the two light-emitting control modules is connected to the drive transistor Tm through the bridge line 90, and the other of the two light-emitting control modules is directly connected to the drive transistor Tm. The control terminals of the two light-emitting control modules can receive different effective pulse widths of the control signals, such that the duration when the first pixel circuit 01 provides the driving current is associated with the overlap period for the effective pulses of the two control signals, thereby adjusting the duration when the first pixel circuit 01 provides the driving current.

As shown in FIG. 7, the first control line Emit1 provides the first control signal Emit1, and the second control line Emit2 provides the second control signal Emit2. In the embodiments of present disclosure, a light-emitting driver circuit is provided in the display panel. The light-emitting driver circuit includes a plurality of cascaded shift registers. For example, a first light-emitting driver circuit includes a plurality of cascaded shift registers. The first control line Emit1 is connected to an output terminal for the shift registers in the first light-emitting driver circuit. A second light-emitting driver circuit includes a plurality of cascaded shift registers. The second control line Emit2 is connected to an output terminal for the shift registers in the second light-emitting driver circuit. Therefore, the effective pulse width of the first control signal Emit1 is different from the effective pulse width of the second control signal Emit2.

In other implementations, the first control signal Emit1 and/or the second control signal Emit2 is provided by a pulse width modulation (PWM) circuit. In the light-emitting stage, the PWM circuit provides a control signal, such that the light-emitting control module is turned off, thereby adjusting the duration when the pixel circuit provides the driving current. The PWM circuit can be designed with reference to the prior art, and is not illustrated herein in the accompanying drawings.

In some implementations, with reference to FIG. 5 and FIG. 8, a first control line Emit1 and a second control line Emit2 are arranged in the display panel. The control terminal of the first light-emitting control module 10 is connected to the first control line Emit1. The control terminal of the second light-emitting control module 20 is connected to the second control line Emit2. The second light-emitting control module 20 is connected between the drive transistor Tm and the light-emitting device LD. The bridge line 90 includes a first bridge line 91. The second light-emitting control module 20 in the first pixel circuit 01 is connected to the drive transistor Tm through the first bridge line 91.

As shown in FIG. 8, the display panel includes a substrate 00 as well as a semiconductor layer 000, a first metal layer 001, a second metal layer 002, a third metal layer 003 and a fourth metal layer 004 that are located on the substrate 00. The device and the wiring in each layer may refer to descriptions on embodiments corresponding to FIG. 2 and FIG. 4. As can be seen from FIG. 8, the bridge line 90 is located in the third metal layer 003. In this way, the bridge line 90 can be manufactured with an original manufacturing process of the display panel, thereby simplifying the manufacture.

In addition, as can be seen from FIG. 8, along a direction e perpendicular to a plane of the display panel (a direction for overlooking FIG. 5), the fourth connecting line X4 located in the third metal layer 003 and the first power terminal Pvdd located in the fourth metal layer 004 overlap with the first light-emitting control transistor T5. The first power terminal Pvdd is connected to the fourth connecting line X4 through the via hole O2. The fourth connecting line X4 is connected to an active layer of the first light-emitting control transistor T5 through a via hole penetrating through the insulation layer. Therefore, the first light-emitting control transistor T5 is coupled to the first power terminal Pvdd.

With reference to FIG. 5 and FIG. 8, along the direction e perpendicular to the plane of the display panel, the first bridge line 91 overlaps with the first control line Emit1 in an insulated manner. When the display panel is manufactured, the semiconductor layer 000 is manufactured on the substrate 00 first, and then the first metal layer 001, the second metal layer 002, the third metal layer 003 and the fourth metal layer 004 are manufactured sequentially. The gate of each transistor in the pixel circuit is located in the first metal layer 001. After the first metal layer 001 is formed by a patterning process, a doping process is performed on the semiconductor layer 000. The doped semiconductor layer 000 can serve as a lead in the pixel circuit. In the doping process, the patterned first metal layer 001 can serve as a doped barrier layer. That is, along the direction e perpendicular to the plane of the substrate 00, a part of the semiconductor layer 000 overlaps with the first metal layer 001, and a remaining part of the semiconductor layer 000 does not overlap with the first metal layer 001. The direction e is also a direction perpendicular to a plane of the display panel after the display panel is manufactured. the lead is formed in the semiconductor layer 000 not overlapping with the first metal layer 001 through the doping process. A channel region of the transistor is formed in the semiconductor layer 000 overlapping with the first metal layer 001 through the doping process. The first metal layer 001 overlapping with the semiconductor layer 000 serves as the gate of the transistor. With the first control line Emit1 located in the first metal layer 001 as an example, as shown in FIG. 8, at the first light-emitting control transistor T5, the first control line Emit1 overlaps with the semiconductor layer 000. A part of the first control line Emit1 overlapping with the semiconductor layer 000 is reused as the gate of the first light-emitting control transistor T5.

In the embodiment of the present disclosure, the first bridge line 91 overlaps with the first control line Emit1 in an insulated manner. Compared with FIG. 2, the semiconductor layer 000 originally connected between the second light-emitting control transistor T6 and the drive transistor Tm can be cut off, the first bridge line 91 is connected to the semiconductor layer 000 through a first via hole V1 and connected to the drive transistor Tm, and the first bridge line 91 is connected to the semiconductor layer 000 through a second via hole V2 and connected to the second light-emitting control transistor T6. In this way, the second light-emitting control transistor T6 is coupled to the drive transistor Tm through the first bridge line 91, and the first control line Emit1 can be arranged along a horizontal direction x. Without winding or other designs on the first control line Emit1, an arrangement of the first control line Emit1 can be simplified. In addition, the first control line Emit1 does not overlap with the semiconductor layer 000 when extending to a vicinity of the second light-emitting control transistor T6, such that a part of the first control line Emit1 is not used as the gate of the second light-emitting control transistor T6. In this way, the second light-emitting control transistor T6 and the first light-emitting control transistor T5 can be controlled by different control signals to adjust a light emission duration of the light-emitting device driven by the first pixel circuit 01.

In addition, as shown in FIG. 5 and FIG. 8, the first light-emitting control module 10 is connected between the drive transistor Tm and the first power terminal Pvdd. The second light-emitting control module 20 is connected between the drive transistor Tm and the light-emitting device LD. The second light-emitting control module 20 is connected to the drive transistor Tm through the bridge line 90.

In other implementations, the first light-emitting control module 10 may also be connected between the drive transistor Tm and the first power terminal Pvdd, and the second light-emitting control module 20 may also be connected between the drive transistor Tm and the light-emitting device LD. The first light-emitting control module 10 is connected to the drive transistor Tm through the bridge line 90, and the second light-emitting control module 20 is directly connected to the drive transistor Tm. The first control line and the second control line are arranged in the display panel. The first control line is connected to the control terminal of the first light-emitting control module 10. The second control line is connected to the control terminal of the second light-emitting control module 20. In the implementation, the bridge line overlaps with the second control line in an insulated manner, which is not shown in the figure herein.

The embodiment from FIG. 5 to FIG. 8 illustrates a solution in which two light-emitting control modules in the first pixel circuit 01 are controlled by different control signals. In the solution, the structure and the working cycle of the first pixel circuit 01 are described. The structure of the first pixel circuit includes a connection manner for connecting the two light-emitting control modules and the drive transistor Tm. In the above-mentioned first solution, the layout of the first pixel circuit can use the design in FIG. 5. In addition, the connection manners for the two light-emitting control modules and the drive transistor in the second pixel circuit in the second solution are the same as those for the two light-emitting control modules and the drive transistor in the first pixel circuit in the first solution. The second pixel circuit in the second solution can be designed with reference to the embodiment from FIG. 5 to FIG. 8, such that one of the two light-emitting control modules in the second pixel circuit is connected to the drive transistor Tm through the bridge line, and the other of the two light-emitting control modules is directly connected to the drive transistor Tm.

Figure 9:
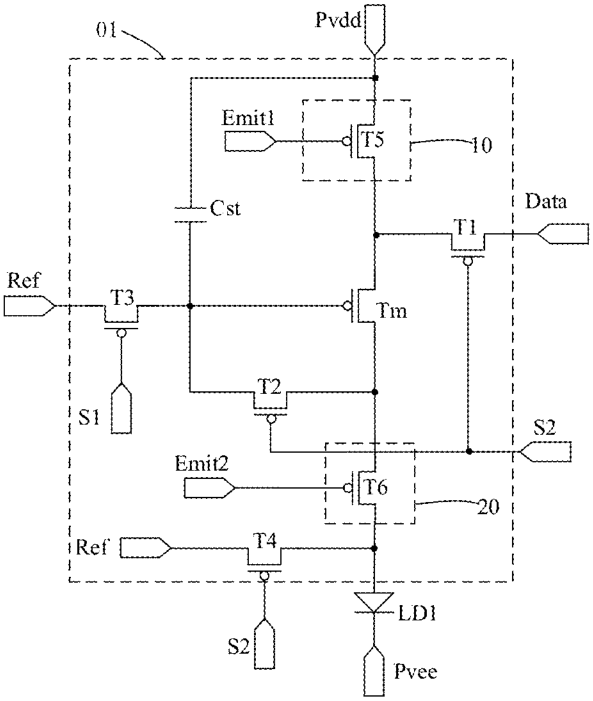
FIG. 9 is a schematic diagram of a pixel circuit in a display panel according to an embodiment of the present disclosure.
Figure 10A:
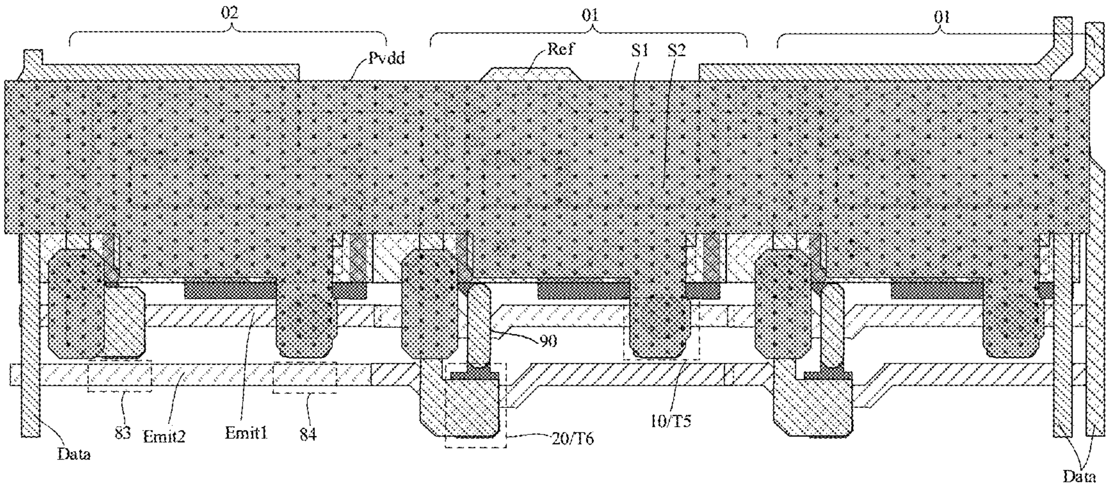
FIG. 10A is a schematic diagram of another display panel according to an embodiment of the present disclosure.

In some implementations, FIG. 9 is a schematic diagram of a pixel circuit in a display panel according to an embodiment of the present disclosure. FIG. 9 illustrates the first pixel circuit 01 and the second pixel circuit 02. The first pixel circuit 01 is coupled to the first light-emitting device LD1. The second pixel circuit 02 is coupled to the second light-emitting device LD2. FIG. 10A is a schematic diagram of another display panel according to an embodiment of the present disclosure. FIG. 10A illustrates a pixel region. The pixel region includes two first pixel circuits 01 and one second pixel circuit 02. The first pixel circuit 01 in FIG. 10A corresponds to the first pixel circuit 01 in FIG. 9, and the second pixel circuit 02 in FIG. 10A corresponds to the second pixel circuit 02 in FIG. 9. Positions of the transistor of the first pixel circuit 01 and the transistor of the second pixel circuit 02 in FIG. 10A may be understood with reference to FIG. 5 and FIG. 2.

As shown in FIG. 9, in the first pixel circuit 01, a control terminal of the first light-emitting control module 10 receives a first control signal Emit1, a control terminal of the second light-emitting control module 20 receives a second control signal Emit2, and an effective pulse width of the first control signal Emit1 is different from an effective pulse width of the second control signal Emit2. Both a control terminal of the first light-emitting control module 10 and a control terminal of the second light-emitting control module 20 in the second pixel circuit 02 receive the first control signal Emit1.

As shown in FIG. 10A, in the first pixel circuit 01, one of the first light-emitting control module 10 and the second light-emitting control module 20 is connected to the drive transistor Tm through the bridge line 90, and the other of the first light-emitting control module and the second light-emitting control module is directly connected to the drive transistor Tm, such that the control terminals of the two light-emitting control modules can receive different signals. The two light-emitting control modules in the second pixel circuit 02 are directly connected to the drive transistor Tm, such that the control terminals of the two light-emitting control modules can receive a same signal. The embodiment of FIG. 10A is a design meeting the first solution.

As shown in FIG. 10A, signal lines, such as a data line Data, a scanning line (the first scanning line S1 and the second scanning line S2), a light-emitting control line (such as the first control line Emit1 and the second control line Emit2), a first power line (not shown in FIG. 10A), and the reset signal line Ref, are arranged in the display panel. The data voltage Data is provided by the data line Data. The first scanning signal S1 is provided by the first scanning line S1. The second scanning signal S2 is provided by the second scanning line S2. The first power terminal Pvdd is connected to the first power line, and provides a first power voltage Pvdd (the power terminal and the voltage signal provided by the power terminal use the same reference sign). The first control signal Emit1 and the second control signal Emit2 are respectively provided by corresponding control lines. In the first pixel circuit 01, the control terminal of the first light-emitting control module 10 is coupled to the first control line Emit1, and the control terminal of the second light-emitting control module 20 is coupled to the second control line Emit2. That is, a part of the first control line Emit1 is reused as the gate of the first light-emitting control transistor T5, and a part of the second control line Emit2 is reused as the gate of the second light-emitting control transistor T6. The control terminals of the two light-emitting control modules in the second pixel circuit 02 are coupled to the first control line Emit1, which may be understood that a part of the first control line Emit1 is also reused as the gate of the first light-emitting control transistor T5 and the gate of the second light-emitting control transistor T6 in the second pixel circuit 02.

In the embodiment of the present disclosure, there are a plurality of first pixel circuits 01 and a plurality of second pixel circuits 02. The first light-emitting device LD1 and the second light-emitting device LD2 respectively driven by the first pixel circuit 01 and the second pixel circuit 02 may be located on a same pixel row (as shown in FIG. 10A), and may also be located on different pixel rows. It may be understood that when the first pixel circuit 01 and the second pixel circuit 02 respectively drive light-emitting devices on a same pixel row, the first scanning signal S1 received by the first pixel circuit and the second pixel circuit is an effective level in same periods, the second scanning signal S2 received by the first pixel circuit and the second pixel circuit is an effective level in same periods, and the first control signals Emit1 received by the first pixel circuit and the second pixel circuit is an effective level in same periods. It may be understood that when the first pixel circuit 01 and the second pixel circuit 02 respectively drive light-emitting devices on different pixel rows, a duration when the first pixel circuit receives the first scanning signal S1 as an effective level and a duration when the second pixel circuit receives the first scanning signal as an effective level are the same, with a difference in starting time of the effective level. Generally, a plurality of pixel rows in the display panel are driven one by one, and a scanning signal is provided by cascaded shift registers for a plurality of scanning lines row by row, so there is a difference between periods when pixel circuits for driving different pixel rows receive an effective level of the scanning signal. Correspondingly, for the first control signal Emit1, a duration when the first pixel circuit 01 receives the effective level of the first control signal Emit1 and a duration when the second pixel circuit 02 receives the effective level of the first control signal are the same, with a difference in starting time of the effective level.

The pixel circuit provided by the embodiment of FIG. 9 and FIG. 10A may be driven by the signal timing in FIG. 7. A working cycle of the first pixel circuit 01 and a working cycle of the second pixel circuit 02 are understood with reference to FIG. 7. For example, the low level signal is the effective pulse signal, and the effective pulse width of the first control signal Emit1 is greater than the effective pulse width of the second control signal Emit2. The working cycle of the first pixel circuit 01 and the working cycle of the second pixel circuit 02 each include a gate reset stage t1, a data writing stage t2, and a light-emitting stage t3.

In the light-emitting stage t3 of the working cycle of the first pixel circuit 01: The effective pulse of the first control signal Emit1 overlaps with the effective pulse of the second control signal Emit2 in a period t31. In a period t32, the first control signal Emit1 is an effective level, and the second control signal Emit2 is a non-effective level. In the period t31, both the first light-emitting control module 10 and the second light-emitting control module 20 in the first pixel circuit 01 are turned on, and the first pixel circuit 01 provides a driving current for the first light-emitting device LD1 to emit light.

In the working cycle of the second pixel circuit 02, in the period t31 and the period t32, the first control signal Emit1 provides the effective pulse, and the first light-emitting control module 10 and the second light-emitting control module 20 in the second pixel circuit 02 are turned on. In the period t31 and the period t32, the second pixel circuit 02 provides a driving current for the second light-emitting device LD2 to emit light. When the signal timing provided by the embodiment of FIG. 7 is used for driving, a light emission duration of the second light-emitting device LD2 can be longer than a light emission duration of the first light-emitting device LD1.

In the implementation, in the first pixel circuit 01, one of the two light-emitting control modules is connected to the drive transistor Tm through the bridge line, and the other of the two light-emitting control modules is directly connected to the drive transistor Tm. The two light-emitting control modules in the second pixel circuit 02 are directly connected to the drive transistor Tm. The control terminals of the two light-emitting control modules in the first pixel circuit 01 can receive different signals, and the control terminals of the two light-emitting control modules in the second pixel circuit 02 receive the same signal. The first pixel circuit and the second pixel circuit are driven in different control manners, such that the light emission channels in the two pixel circuits are connected for different durations. In the light-emitting stage t3 of the first pixel circuit 01, the duration when the first pixel circuit provides the driving current is controlled by an overlap duration for the effective pulse width of the first control signal Emit1 and the effective pulse width of the second control signal Emit2. In the light-emitting stage t3 of the second pixel circuit 02, the duration when the second pixel circuit provides the driving current is controlled only by the effective pulse width of the first control signal Emit1. The duration when the second pixel circuit 02 provides the driving current is longer than the duration when the first pixel circuit 01 provides the driving current, such that the light emission duration of the second light-emitting device LD2 is longer than the light emission duration of the first light-emitting device LD1. This can compensate differences of different light-emitting devices in luminous efficiency, and improve the display effect of the display panel.

In some implementations, in the embodiment of FIG. 9, the first light-emitting device LD1 emits green light or emits blue light, and the second light-emitting device LD2 emits red light. That is, in the display panel, the red light-emitting device is driven by the second pixel circuit 02 in FIG. 9, and the green light-emitting device and the blue light-emitting device are driven by the first pixel circuit 01 in FIG. 9.

Corresponding to the embodiment of FIG. 10A, one of the two first pixel circuits 01 in FIG. 10A is coupled to the green light-emitting device, and the other of the two first pixel circuits is coupled to the blue light-emitting device. The second pixel circuit 02 in FIG. 10A is coupled to the red light-emitting device. When the pixel circuit is driven with the signal timing provided by the embodiment of FIG. 7, the red light-emitting device can have a longer light emission duration to compensate differences of light-emitting devices of different colors in luminous efficiency. The red light-emitting device with lower luminous efficiency can have the longer light emission duration. This can correct the color shift, and improve the display effect in applications.

Figure 10B:
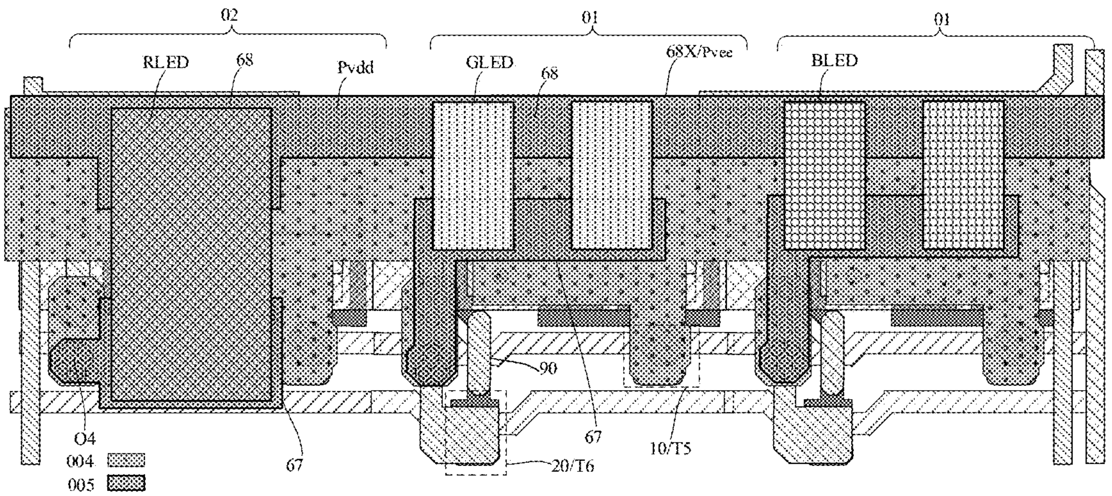
FIG. 10B is a schematic diagram of another display panel according to an embodiment of the present disclosure.

In some implementations, FIG. 10B is a schematic diagram of another display panel according to an embodiment of the present disclosure. On the basis of FIG. 10A, FIG. 10B illustrates a red light-emitting device RLED, a green light-emitting device GLED, and a blue light-emitting device BLED in the pixel region. The pixel region includes a red sub-pixel, a green sub-pixel, and a blue sub-pixel. The red sub-pixel includes the red light-emitting device RLED. The green sub-pixel includes the green light-emitting device GLED. The blue sub-pixel includes the blue light-emitting device BLED. FIG. 10B further illustrates a first electrode 67 and a second electrode 68 in each sub-pixel. The first electrode 67 is connected to the connection electrode X5 (as shown in FIG. 4) through a via hole O4, and connected to the pixel circuit through the connection electrode X5. In the embodiments of present disclosure, the light-emitting device includes an anode electrically connected to the first electrode 67, and a cathode electrically connected to the second electrode 68. The second electrodes 68 of all sub-pixels in the pixel region are electrically connected to each other to form a transversely extending second auxiliary power line 68X. The second auxiliary power line 68X can serve as a second power terminal Pvee in the pixel region. The first power terminal Pvdd may be understood with reference to related descriptions on FIG. 10A. In the embodiments of present disclosure, the first electrode 67 and the second auxiliary power line 68X are located in the fifth metal layer 005. The first power terminal Pvdd is located in the fourth metal layer 004. The fifth metal layer 005 is located at a side of the fourth metal layer 004 away from the substrate.

In the embodiments of present disclosure, as shown in FIG. 10B, a size of the red light-emitting device RLED is greater than a size of the green light-emitting device GLED, and the size of the red light-emitting device RLED is also greater than a size of the blue light-emitting device BLED. The greater size of the red light-emitting device RLED can increase luminance of the red sub-pixel. This can compensate differences between the red light-emitting device RLED and the green light-emitting device GLED/the blue light-emitting device BLED in luminous efficiency.

In the embodiments of present disclosure, a region of the green sub-pixel and a region of the blue sub-pixel each may be provided with a redundant position. The green sub-pixel is used as an example. In a solution, the region of the green sub-pixel includes one green light-emitting device GLED. When the green light-emitting device GLED cannot emit light normally, another green light-emitting device GLED is further provided at the redundant position of the region. In another solution, the region of the green sub-pixel is directly provided with two green light-emitting devices GLED. When one green light-emitting device GLED is damaged and cannot emit light, the other green light-emitting device GLED can work normally to ensure light emission of the sub-pixel. As shown in FIG. 10B, the region of the green sub-pixel is provided with two green light-emitting devices GLED, and the region of the blue sub-pixel is provided with two blue light-emitting devices BLED.

Figure 11:
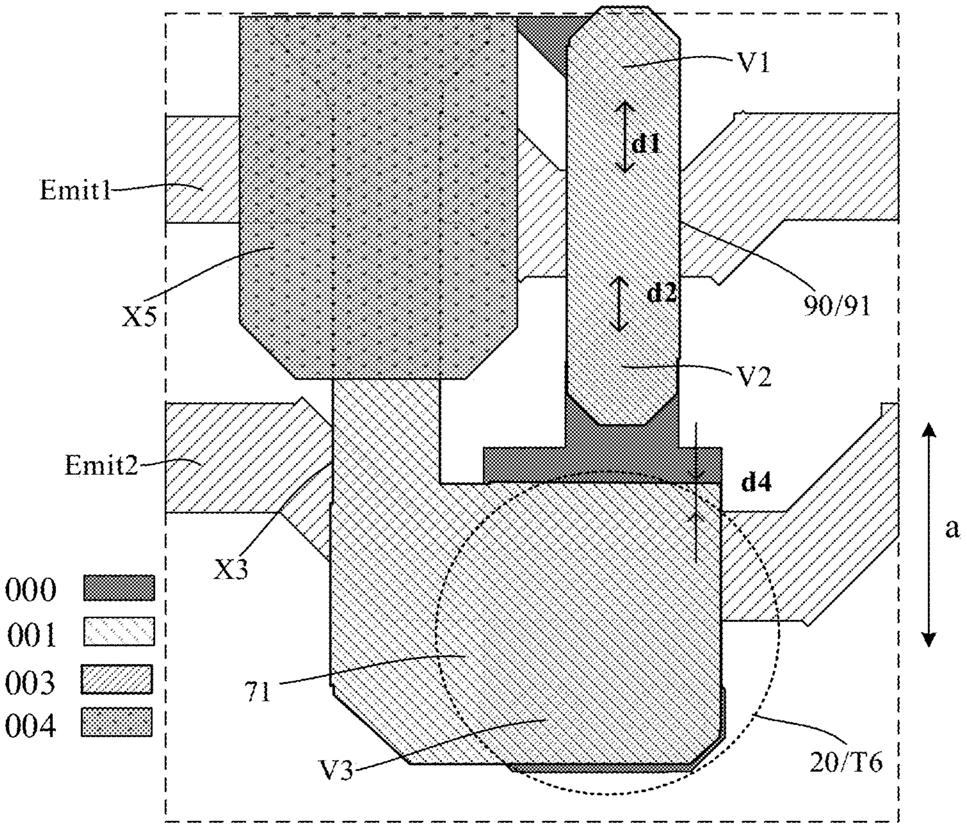
FIG. 11 is a schematic enlarged diagram of a region Q1 shown in FIG. 5.

In some implementations, FIG. 11 is a schematic enlarged diagram of a region Q1 shown in FIG. 5. With reference to FIG. 5 and FIG. 11, the first bridge line 91 is connected to the drive transistor Tm through a first via hole V1. The first bridge line 91 is connected to the second light-emitting control module 20 through a second via hole V2. As shown in FIG. 11, along a direction parallel to the plane of the display panel, namely in a direction parallel to paper, a distance from the first via hole V1 to the first control line Emit1 is d1, and a distance from the second via hole V2 to the first control line Emit1 is d2, d1≥2.5 μm, and/or d2≥2.5 μm. This can ensure that the safe distance between the via hole and the first control line Emit1 is large enough, and prevent a short circuit between metal in the via hole and the first control line Emit1 due to an error in the manufacturing process.

FIG. 11 illustrates the safe distance between the first control line Emit1 and the via hole in the first bridge line 91. When the first control line Emit1 is adjacent to the via hole in other structures, the safe distance between the first control line Emit1 and the via hole may also be large enough to prevent a short circuit. In addition, the second control line Emit2 may also be designed with reference to the first control line Emit1. When the second control line Emit2 is adjacent to the via hole, a distance between the second control line and the via hole is also not less than 2.5 μm. In the following related embodiments, for a solution in which the control line is adjacent to the via hole, the safe distance between the control line and the via hole may be designed with reference to descriptions herein.

Figure 12:
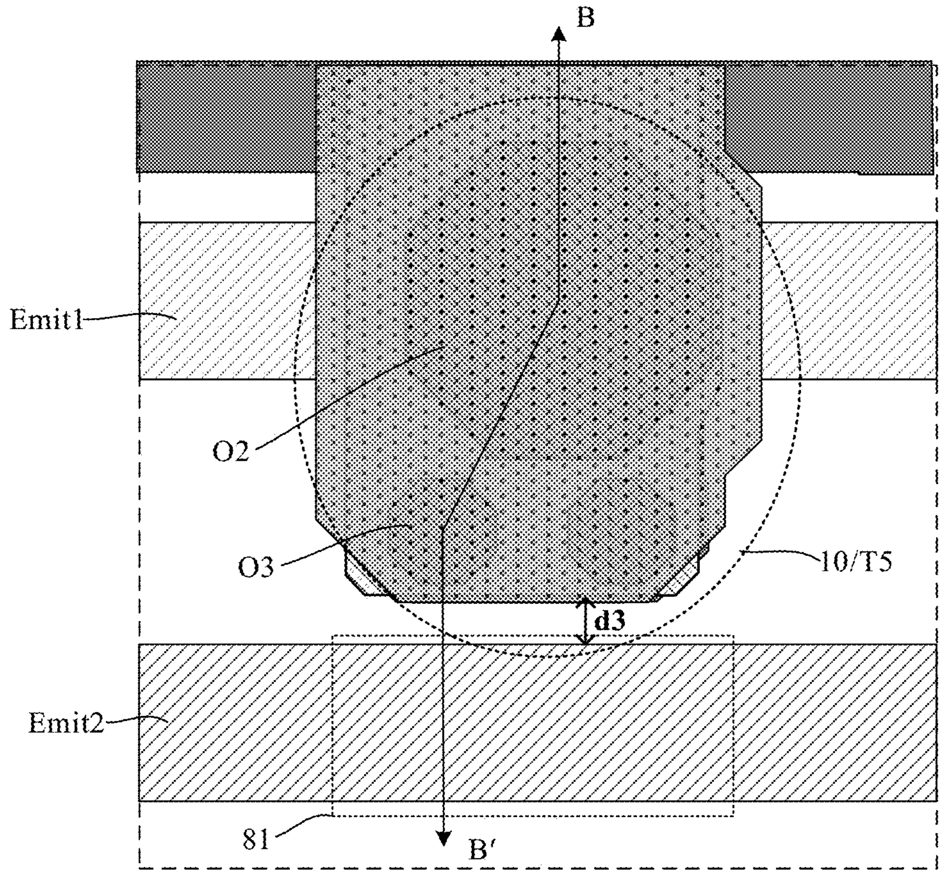
FIG. 12 is a schematic enlarged diagram of a region Q2 shown in FIG. 5.
Figure 13:
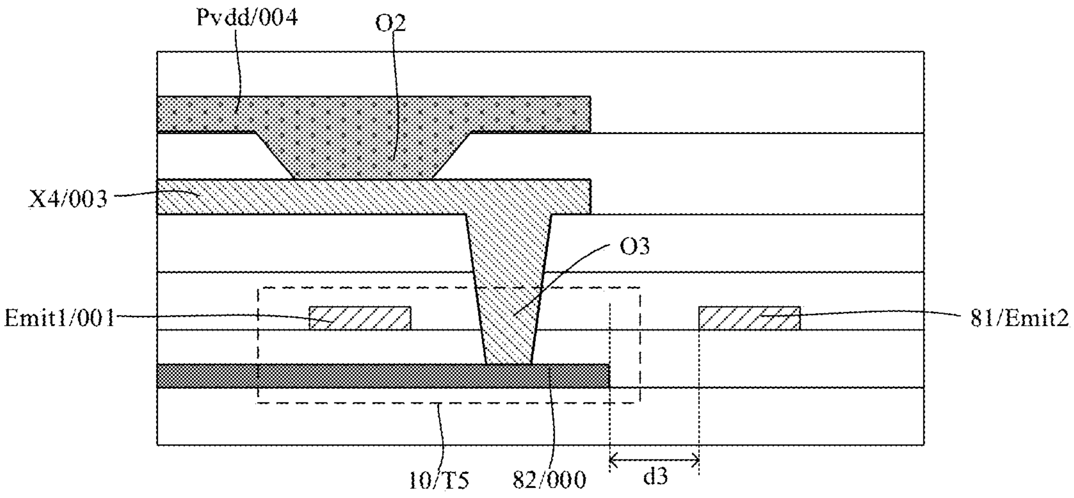
FIG. 13 is a schematic cross-sectional view along a line B-B' shown in FIG. 12.

In some implementations, FIG. 12 is a schematic enlarged diagram of a region Q2 shown in FIG. 5. FIG. 13 is a schematic cross-sectional view along a line B-B' shown in FIG. 12. With reference to FIG. 5 and FIG. 12, the second control line Emit2 includes a first wiring portion 81. The first wiring portion 81 is adjacent to the first light-emitting control module 10 in the first pixel circuit 01. With reference to FIG. 13, the first light-emitting control module 10 includes the first light-emitting control transistor T5. The active layer of the first light-emitting control transistor T5 is located in the semiconductor layer 000. The active layer of the first light-emitting control transistor T5 includes a first electrode region 82. The first electrode region 82 is located at a side of the active layer close to the first wiring portion 81. The fourth connecting line X4 is connected to the first electrode region 82 through a via hole O3. The first power terminal Pvdd is connected to the fourth connecting line X4 through the via hole O2. Therefore, the first light-emitting control transistor T5 is connected to the first power terminal Pvdd. In the implementation, the fourth connecting line X4 is located in the third metal layer 003, the first power terminal Pvdd is located in the fourth metal layer 004, and the first control line Emit1 and the second control line Emit2 are located in the first metal layer 001. As can be seen from FIG. 12, the fourth connecting line X4 is connected to the first electrode region 82 through two via holes O3 to reduce connection impedance.

As shown in FIG. 12 and FIG. 13, along a direction parallel to a plane of the display panel, a distance from the first wiring portion 81 in the second control line Emit2 to the first electrode region 82 is d3, d3≥1.5 μm. When the display panel is manufactured, the patterned semiconductor layer 000 is manufactured first. The patterned first metal layer 001 is manufactured. A doping process is performed on the semiconductor layer 000. Upon completion of the doping process, a channel of the transistor is formed in a part of the semiconductor layer 000 overlapping with the first metal layer 001, and a lead is formed in the semiconductor layer 000 not overlapping with the first metal layer 001. When the first wiring portion 81 and the first electrode region 82 are too close, a part of the first electrode region 82 may form a new channel upon completion of the doping process. In the embodiment of the present disclosure, by setting d3≥1.5 μm, the safe distance between the first wiring portion 81 and the first electrode region 82 is large enough, to prevent the new channel in the first electrode region 82, and ensure the manufacturing yield.

In the embodiment of FIG. 12 and FIG. 13, when the second control line Emit2 is adjacent to the structure in the semiconductor layer 000, the safe distance is required to prevent the new channel. In addition, the first control line Emit1 may also be designed with reference to the second control line Emit2. When the first control line Emit1 is adjacent to the semiconductor layer 000, a large enough safe distance may also be formed between the first control line Emit1 and the semiconductor layer 00 to prevent the new channel. In the following related embodiments, for a solution in which the control line of the first metal layer 001 is adjacent to the semiconductor layer 000, the safe distance between the control line and the semiconductor layer may refer to descriptions herein.

Figure 14:
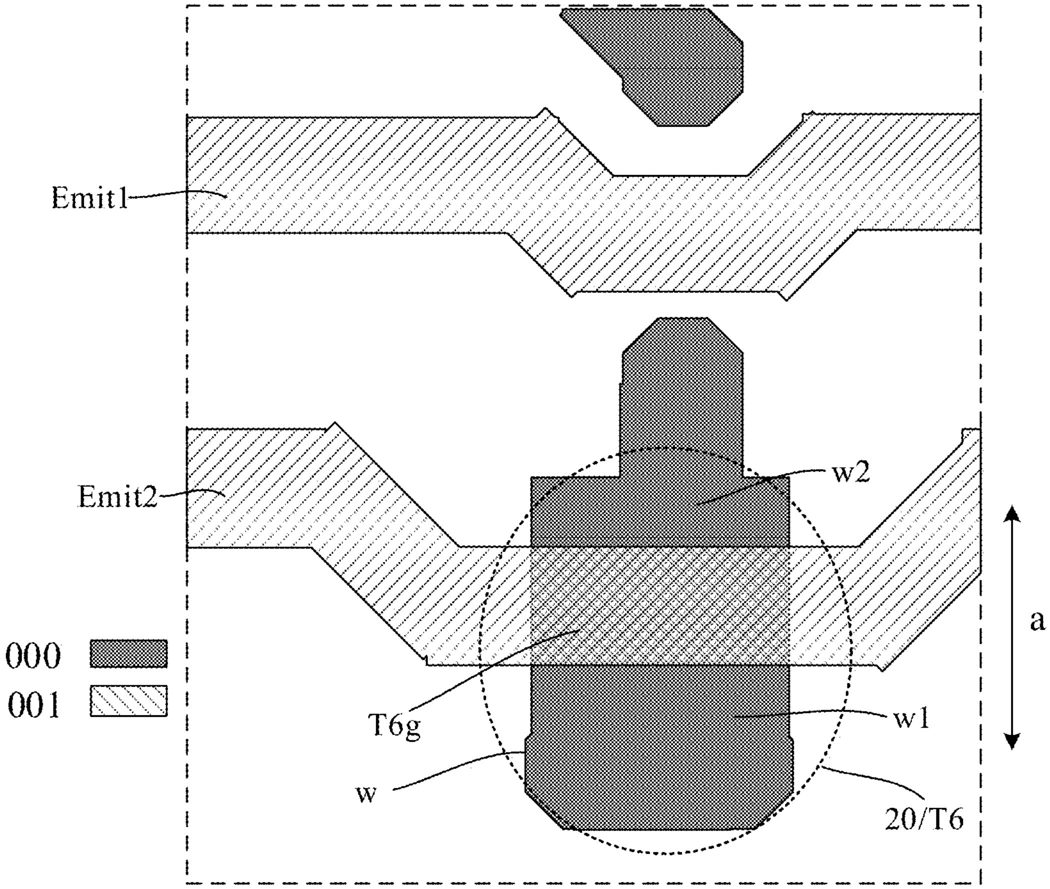
FIG. 14 is a schematic diagram after a semiconductor layer and a first metal layer are retained in FIG. 11.

In some implementations, FIG. 14 is a schematic diagram after a semiconductor layer and a first metal layer are retained in FIG. 11. With reference to FIG. 11 and FIG. 14, the second light-emitting control module 20 in the first pixel circuit 01 includes the second light-emitting control transistor T6. The second light-emitting control transistor T6 includes a gate Tog and an active layer w. The active layer w of the second light-emitting control transistor T6 is located in the semiconductor layer 000. The active layer w includes a second electrode region w1, a channel (not shown in FIG. 14), and a third electrode region w2 arranged along a first direction a. It may be understood that the channel is formed in a portion of the active layer w located between the second electrode region w1 and the third electrode region w2. At least one of wirings in the second control line Emit2 is reused as the gate T6g of the second light-emitting control transistor T6. A portion of the active layer w of the second light-emitting control transistor T6 overlapping with the gate Tog forms the channel.

With reference to FIG. 11, the display panel further includes a first connection electrode 71. The first connection electrode 71 includes one terminal connected to the second electrode region w1 through a third via hole V3, and the other terminal covering the channel of the second light-emitting control transistor T6 and partially overlapping with the third electrode region w2. A length of the first connection electrode 71 beyond the channel along the first direction a is d4, d4≥1 μm. In this way, the first connection electrode 71 can take a shading effect to prevent light from irradiating onto the channel to cause electric leakage and affect work performance of the pixel circuit.

The first connection electrode 71 serves as a part of the third connecting line X3. The third connecting line X3 is connected to the connection electrode X5 through the via hole, and connected to the light-emitting device through the connection electrode X5, thereby realizing connection between the second light-emitting control transistor T6 and the light-emitting device.

In addition, as can be seen from FIG. 11, the first connection electrode 71 is connected to the second electrode region w1 through two third via holes V3 to reduce connection impedance.

In some implementations, as shown in FIG. 10A, there are two first pixel circuits 01 and one second pixel circuit 02 in the pixel region. The display panel includes a first control line Emit1 and a second control line Emit2. The control terminal of the first light-emitting control module 10 in the first pixel circuit 01 is connected to the first control line Emit1. The control terminal of the second light-emitting control module 20 in the first pixel circuit 01 is connected to the second control line Emit2. The two light-emitting control modules in the second pixel circuit 02 are connected to the first control line Emit1. The second control line Emit2 includes a second wiring portion 83 and a third wiring portion 84. The second wiring portion 83 is adjacent to the second light-emitting control module 20 in the second pixel circuit 02. The third wiring portion 84 is adjacent to the first light-emitting control module 10 in the second pixel circuit 02.

Figure 15:
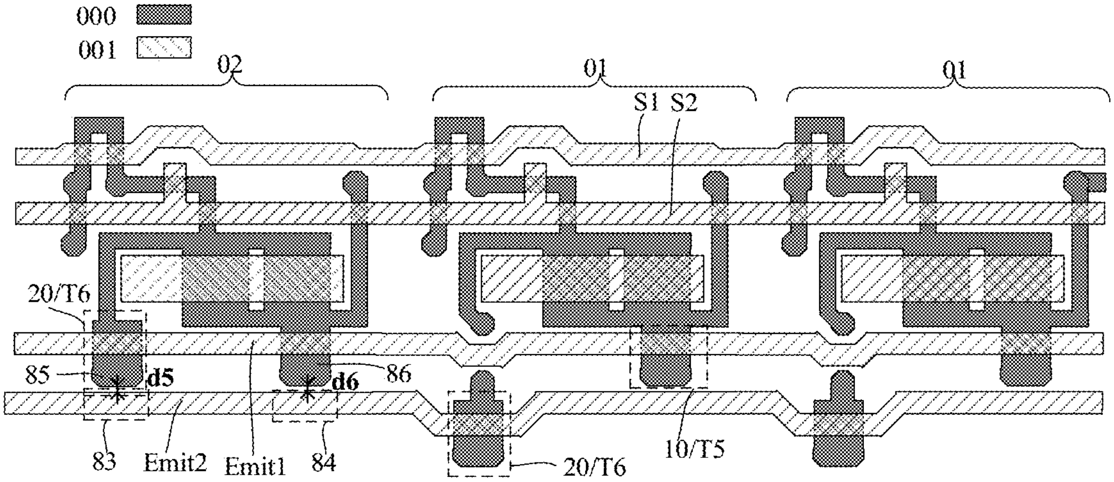
FIG. 15 is a schematic diagram after a semiconductor layer and a first metal layer are retained in FIG. 10A.

FIG. 15 is a schematic diagram after a semiconductor layer and a first metal layer are retained in FIG. 10A. The positions of the first light-emitting control module 10 and the second light-emitting control module 20 are labeled in FIG. 15. As shown in FIG. 15, the second light-emitting control module 20 in the second pixel circuit 02 includes a fourth electrode region 85 located in the semiconductor layer 000 and close to one side of second wiring portion 83. The first light-emitting control module 10 in the second pixel circuit 02 includes a fifth electrode region 86 located in the semiconductor layer 000 and close to one side of the third wiring portion 84. The fifth electrode region 86 of the first light-emitting control module 10 in the second pixel circuit 02 has a basically same shape as the first electrode region 82 of the first light-emitting control module 10 in the first pixel circuit 01. The fourth electrode region 85 of the second light-emitting control module 20 in the second pixel circuit 02 is similar to the second electrode region w1 in FIG. 11. The fourth electrode region 85 is also connected to the connection electrode X5 through a via hole, so as to connect the second light-emitting control module 20 to the light-emitting device.

As shown in FIG. 15, along a direction parallel to a plane of the display panel, a distance from the second wiring portion 83 to the fourth electrode region 85 is d5, and a distance from the third wiring portion 84 to the fifth electrode region 86 is d6, d5≥1.5 μm, and/or d6≥1.5 μm. In this way, the safe distance between the second wiring portion 83 and the fourth electrode region 85 can be large enough, and/or the safe distance between the third wiring portion 84 and the fifth electrode region 86 can be large enough, to prevent the new channel in the fourth electrode region 85 and/or the fifth electrode region 86, and ensure the manufacturing yield.

Figure 16:
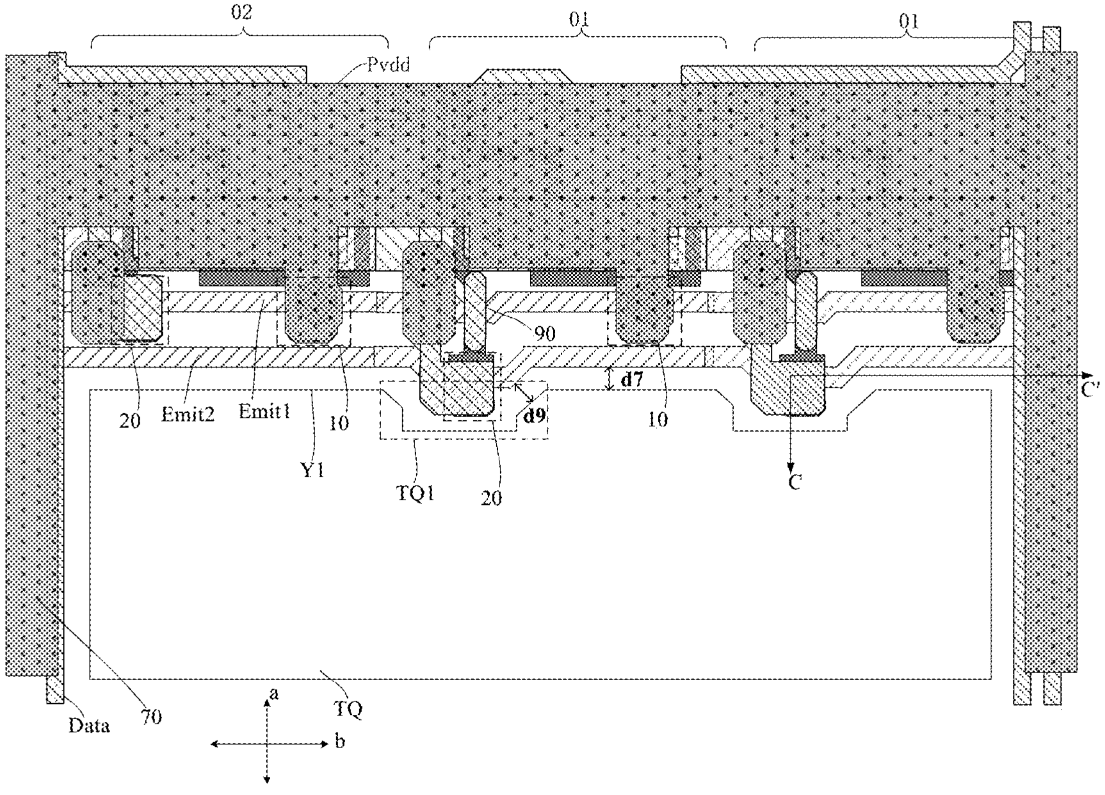
FIG. 16 is a schematic diagram of another display panel according to an embodiment of the present disclosure.
Figure 17:
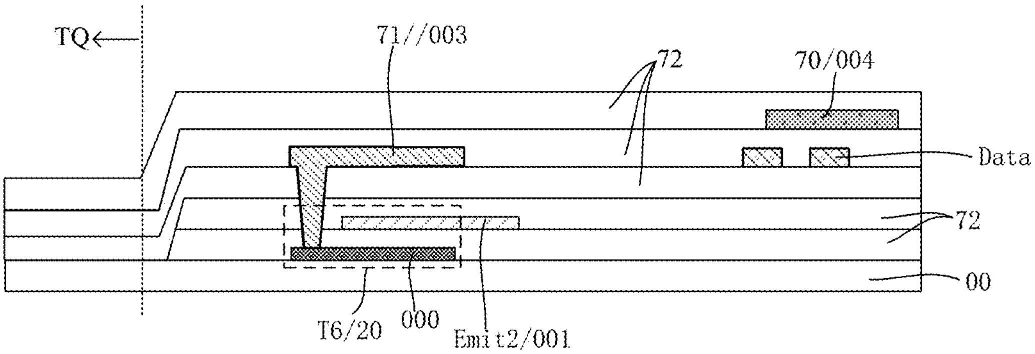
FIG. 17 is a schematic cross-sectional view along a line C-C' shown in FIG. 16.

In some implementations, an embodiment of the present disclosure further provides a transparent display panel. The display panel includes a transmission region and a non-transmission region. FIG. 16 is a schematic diagram of another display panel according to an embodiment of the present disclosure. FIG. 17 is a schematic cross-sectional view along a line C-C' in FIG. 16. FIG. 16 illustrates a pixel region. As a matter of fact, a plurality of pixel regions are arranged in the display panel in an array. As shown in FIG. 16, the pixel region includes a circuit region (not shown in FIG. 16) and a transmission region TQ. The circuit region is a region provided with the pixel circuit. The circuit region includes two first pixel circuits 01 and one second pixel circuit 02. FIG. 16 illustrates the same pixel region as FIG. 10A, and the transmission region TQ and the first power line 70 are shown in FIG. 16 on the basis of FIG. 10A.

As shown in FIG. 16, the display panel includes a first control line Emit1 and a second control line Emit2. The control terminal of the first light-emitting control module 10 in the first pixel circuit 01 is connected to the first control line Emit1. The control terminal of the second light-emitting control module 20 in the first pixel circuit 01 is connected to the second control line Emit2. The control terminals of the two light-emitting control modules in the second pixel circuit 02 are connected to the first control line Emit1. Positions of the two light-emitting control modules in the pixel circuit can be understood with reference to the above related accompanying drawings. In the implementation, in the first pixel circuit 01, the first light-emitting control module 10 is directly connected to the drive transistor Tm, and the second light-emitting control module 20 is connected to the drive transistor Tm through the bridge line. The two light-emitting control modules in the second pixel circuit 02 are directly connected to the drive transistor Tm.

With reference to FIG. 17, the display panel includes a substrate 00 as well as a semiconductor layer 000 and a plurality of metal layers on the substrate 00, such as the first metal layer 001, the third metal layer 003 and the fourth metal layer 004 shown in FIG. 17, and the second metal layer not shown. An insulation layer 72 is further provided between adjacent metal layers as well as between the semiconductor layer 000 and the first metal layer 001. At least one insulation layer 72 in the transmission region TQ is provided with a hollow. When the display panel is manufactured, the insulation layer 72 is etched by an etching process to form the hollow. The hollow in the insulation layer 72 can improve light transmittance of the transmission region TQ, and can improve a display effect in transparent display.

The insulation layer 72 in the display panel includes an organic insulation layer and an inorganic insulation layer. The inorganic insulation layer poses a larger influence on the transmittance. As shown in FIG. 17, the insulation layer 72 between the semiconductor layer 000 and the first metal layer 001, as well as the insulation layer 72 between the first metal layer 001 and the second metal layer, is provided with the hollow. The two insulation layers 72 are inorganic insulation layers. In the embodiments of present disclosure, the insulation layer 72 between the third metal layer 003 and the fourth metal layer 004, as well as the insulation layer 72 at a side of the fourth metal layer 004 away from the substrate 00, is the organic insulation layer. According to the embodiment of FIG. 17, the transmission region TQ has larger transmittance, and the organic insulation layer retained in the transmission region TQ can prevent an overlarge step between the transmission region TQ and the circuit region to affect subsequent manufacturing process.

FIG. 17 illustrates a boundary of the transmission region TQ with a dotted line. At least one insulation layer 72 in the transmission region TQ is provided with the hollow. When the display panel is manufactured, while the insulation layer 72 is manufactured, the hollow of the insulation layer in the transmission region TQ can be etched, or after a plurality of metal film layers of the display panel are manufactured, a plurality of insulation layers 72 are etched at the same time to form the hollows. Due to the hollow of the insulation layer in the transmission region TQ, there is a step between the transmission region TQ and the circuit region to form a groove in the display panel. A position of the groove is the transmission region TQ. The boundary of the transmission region TQ can be defined at the step in the display panel. As shown in FIG. 17, the transmission region TQ takes a bottom edge of the groove in the display panel as the boundary. When a distance to the transmission region TQ is designed in the following related embodiments, a distance to the bottom edge of the groove is used for calculation.

As shown in FIG. 16, the second control line Emit2 is adjacent to the transmission region TQ. A distance from the second control line Emit2 to the transmission region TQ is d7, d7_5.5 μm. In the implementation, with a certain distance from the second control line Emit2 to the transmission region TQ, the insulation layer 72 is not overetched to form the hollow to affect the second control line Emit2.

As shown in FIG. 16, the first control line Emit1 and the second control line Emit2 are arranged in the pixel region. The first control line Emit1 is located at a side of the second control line Emit2 close to the first pixel circuit 01. In the first pixel circuit 01, the first light-emitting control module 10 is directly connected to the drive transistor Tm, and the second light-emitting control module 20 is connected to the drive transistor Tm through the bridge line 90. Consequently, in the first pixel circuit 01, the control terminal of the first light-emitting control module 10 is connected to the first control line Emit1, and the control terminal of the second light-emitting control module 20 is connected to the second control line Emit2. The two light-emitting control modules of the first pixel circuit 01 are respectively controlled by two control signals. The first control line Emit is located at the side of the second control line Emit2 close to the first pixel circuit 01, such that the two light-emitting control modules in the second pixel circuit 02 are connected to the control line conveniently. When the control terminals of the two light-emitting control modules in the second pixel circuit 02 are connected to the first control line Emit1, the two light-emitting control modules can be directly connected to the drive transistor Tm, and the bridge line connected to the drive transistor Tm is unnecessarily provided in the second pixel circuit 02. This reduces an occupied area of the second pixel circuit 02. In the transparent display, this increases an area of the transmission region TQ and improves a transparent display effect.

In some implementations, as shown in FIG. 16, the three pixel circuits in the pixel region are arranged in a second direction b. The first control line Emit1 and the second control line Emit2 extend along the second direction b. The data line Data and the first power line 70 extend along the first direction a. Since the control terminal of the second light-emitting control module 20 in the first pixel circuit 01 is connected to the second control line Emit2, the second light-emitting control module 20 needs to avoid the first control line Emit1, and the second light-emitting control module 20 is connected to the drive transistor Tm through the bridge line 90. In this way, the second light-emitting control module 20 protrudes outward along the first direction a. In the embodiment of the present disclosure, the transmission region TQ is provided with a recess TQ1. The recess TQ1 is a shape feature of the transmission region TQ from an overlooking angle. The second light-emitting control module 20 in the first pixel circuit 01 is opposite to the recess TQ1. In addition, a first edge Y1 adjacent to the second control line Emit2 in the transmission region TQ is approximately parallel to the second control line Emit2. In the implementation, the shape of the transmission region TQ can be designed according to the boundary of the circuit region, the area of the transmission region TQ is increased with a space to uttermost, and the display effect of the transparent display is improved.

As shown in FIG. 16, the second control line Emit2 is adjacent to the transmission region TQ. A corner of the recess TQ1 adjacent to the second control line Emit2 is a chamfer. The chamfer is formed by cutting a corner angle into an oblique plane. This can ensure that a distance d9 between the chamfer and the second control line Emit2 meets a safe distance between the chamfer and the second control line, and prevent the transmission region TQ from being overetched to affect the second control line Emit2. In the embodiments of present disclosure, d9≥5.5 μm.

Figure 18:
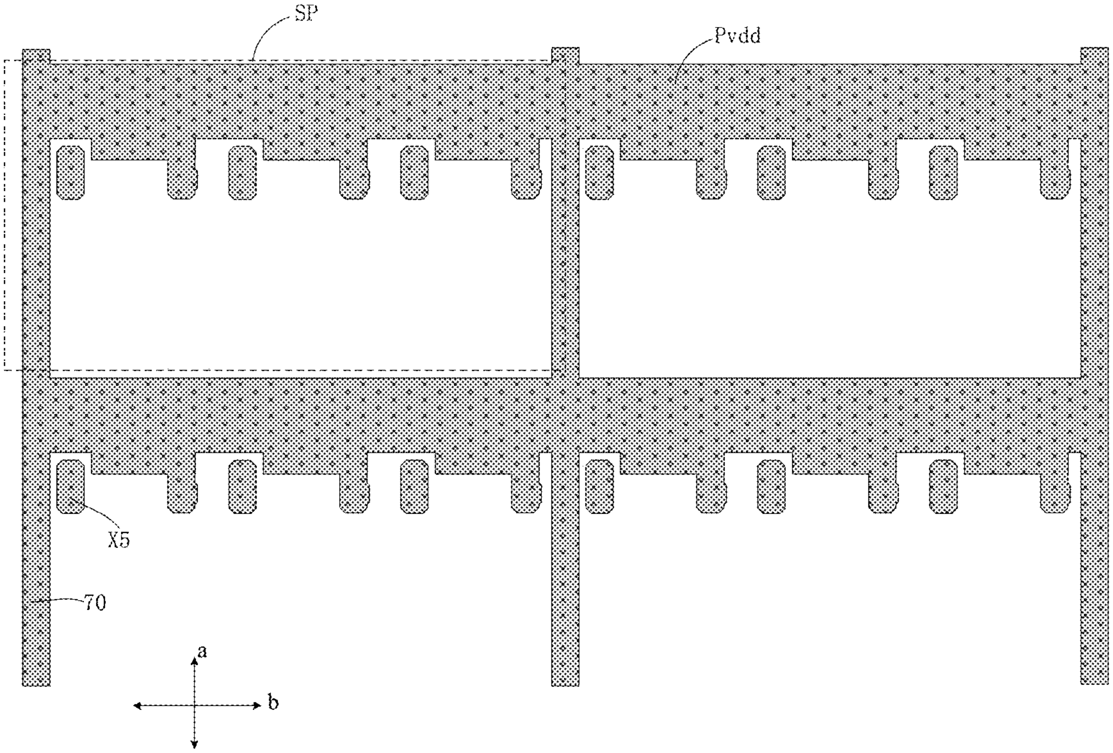
FIG. 18 is a schematic diagram of another display panel according to an embodiment of the present disclosure.

In addition, as shown in FIG. 16, the first power terminal Pvdd in the pixel region is a blocky structure, and the first power terminal Pvdd overlaps with the three pixel circuits. The blocky first power terminal Pvdd may also be called a first power connecting plate. The first power terminal Pvdd is connected to first power lines 70 at a left side and a right side of the first power terminal. FIG. 18 is a schematic diagram of another display panel according to an embodiment of the present disclosure. FIG. 18 illustrates the first power line 70 and the first power terminal Pvdd in four pixel regions SP, as well as the connection electrode X5 connected to the light-emitting device in each pixel circuit. As can be seen from FIG. 18, a plurality of first power terminals Pvdd arranged along the second direction b can be connected to each other to form a first auxiliary power line. The first auxiliary power line and the first power line 70 intersect with each other and are electrically connected to form a latticed wiring. This can reduce a voltage drop of a power signal in transmission, and improve in-plane uniformity.

In addition, a plurality of second power lines are further arranged in the display panel. An extension direction of each of the second power lines is the same as an extension direction of the first power line 70. The second power line and the second auxiliary power line 68X (as shown in FIG. 10B) intersect with each other and are electrically connected to form a latticed wiring. This can reduce the voltage drop of the power signal in the transmission. In the embodiments of present disclosure, the second power line and the second auxiliary power line 68X are located in a same layer.

Figure 19:
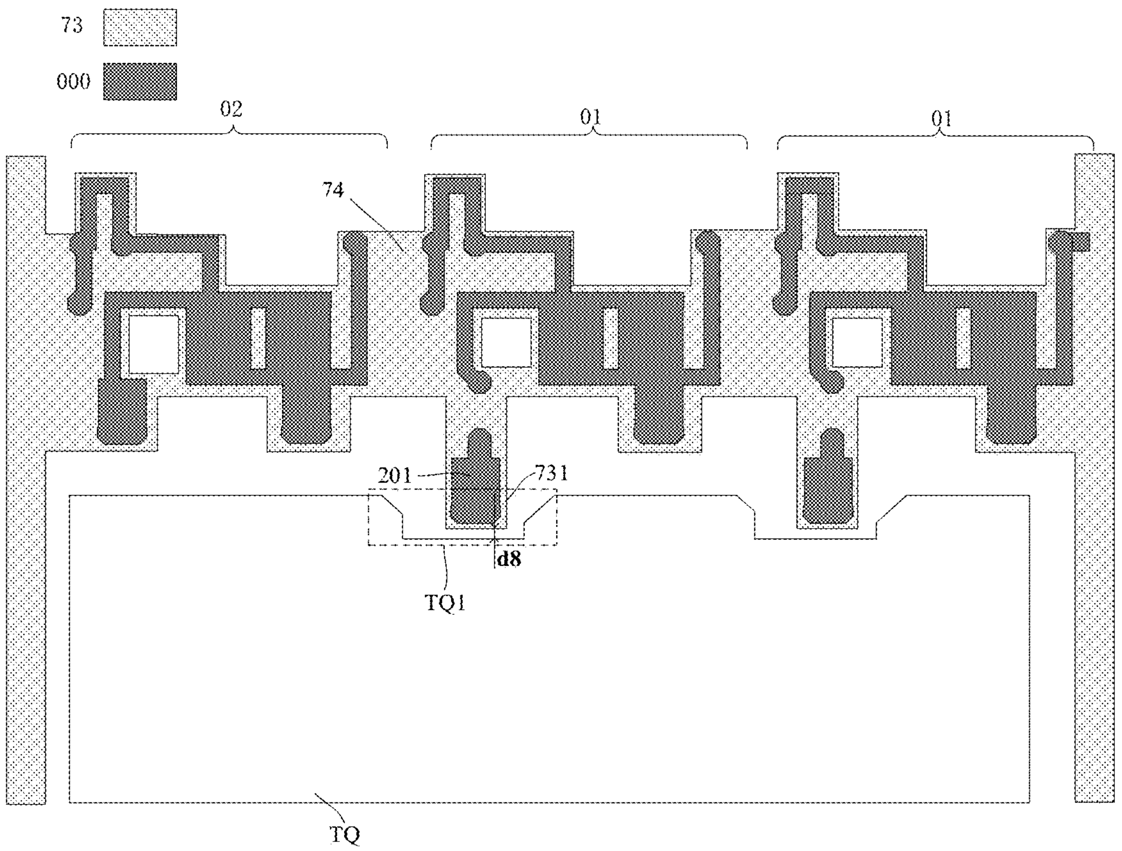
FIG. 19 is a schematic diagram of another display panel according to an embodiment of the present disclosure.

In other implementations, FIG. 19 is a schematic diagram of another display panel according to an embodiment of the present disclosure. FIG. 19 is a top view of a pixel region. The pixel region in FIG. 19 corresponds to the pixel region in FIG. 16. The semiconductor layer 000 in FIG. 16 is retained in FIG. 19. As shown in FIG. 19, the display panel further includes a light-shielding layer 73. The light-shielding layer 73 is located between the substrate and the semiconductor layer 000. While an overlooking direction is the same as a projection direction of orthographic projection of each of the light-shielding layer 73 and the semiconductor layer 000 on the substrate, it can be seen from FIG. 19 that the orthographic projection of the light-shielding layer 73 on the substrate covers the orthographic projection of the semiconductor layer 000 on the substrate. In the transparent display, the light-shielding layer 73 can shade light at a side of the semiconductor layer 000 close to the substrate, and can prevent ambient light from irradiating the channel in the semiconductor layer 000 to cause current leakage of the transistor, thereby making performance of the transparent display more reliable.

As shown in FIG. 19, the light-shielding layer 73 includes a first portion 731. The second light-emitting control module 20 (the position of the second light-emitting control module 20 can be determined with reference to FIG. 16) in the first pixel circuit 01 includes the semiconductor layer 201. The semiconductor layer 201 is the active layer in the second light-emitting control module 20. Along a direction perpendicular to a plane of the display panel, the first portion 731 overlaps with the semiconductor layer 201 in the second light-emitting control module 20. The first portion 731 is partially opposite to the recess TQ1. A distance from the first portion 731 to the transmission region TQ is d8, d8≥4.7 μm. This can ensure that the safe distance between the transmission region TQ and the light-shielding layer 73 is large enough, and prevent the insulation layer in the transmission region TQ from being overetched to affect the light-shielding layer 73.

Figure 20:
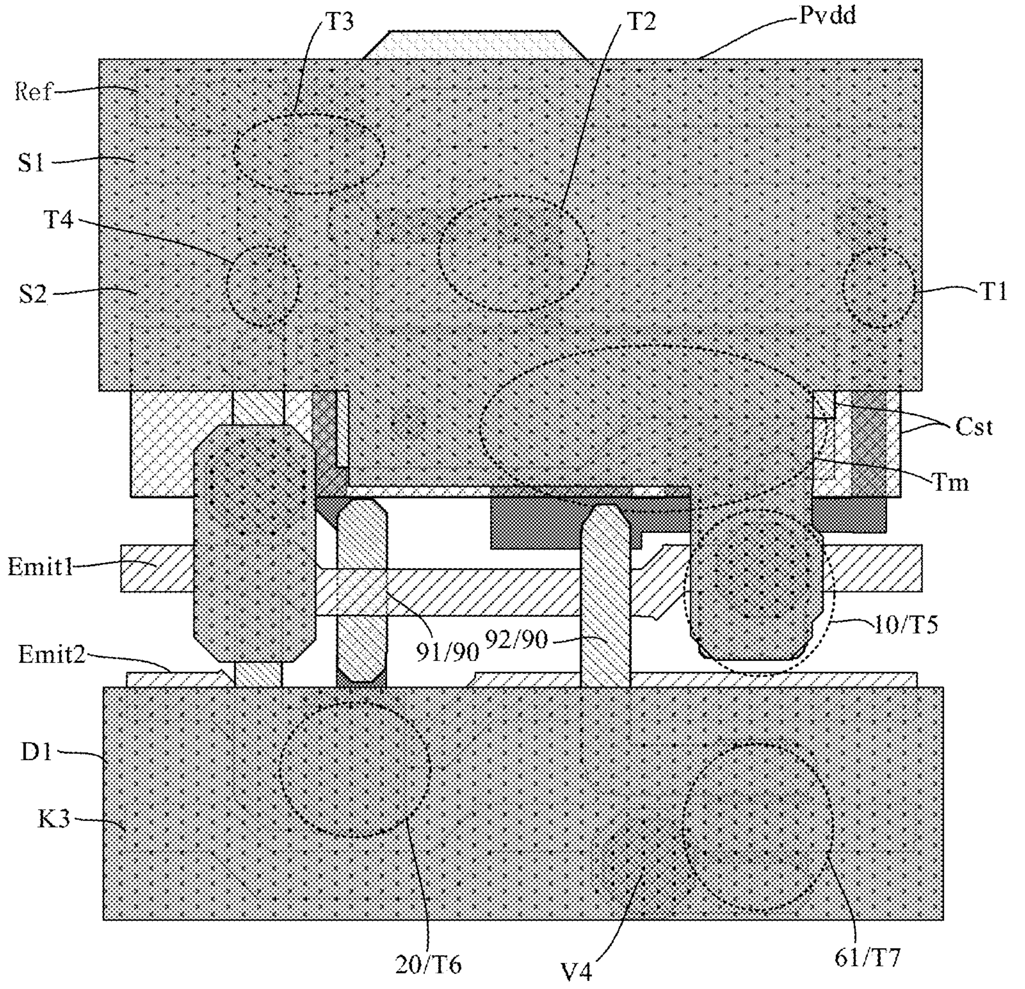
FIG. 20 is a schematic diagram of another display panel according to an embodiment of the present disclosure.
Figure 21:
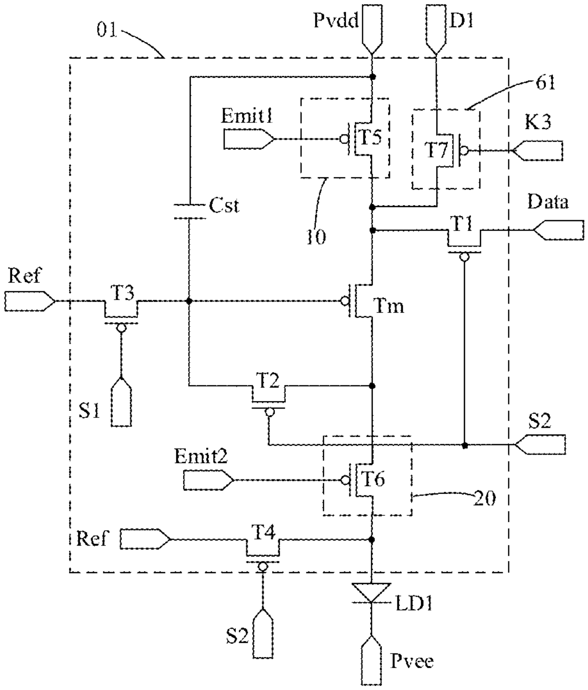
FIG. 21 is a schematic diagram of another pixel circuit according to an embodiment of the present disclosure.
Figure 22:
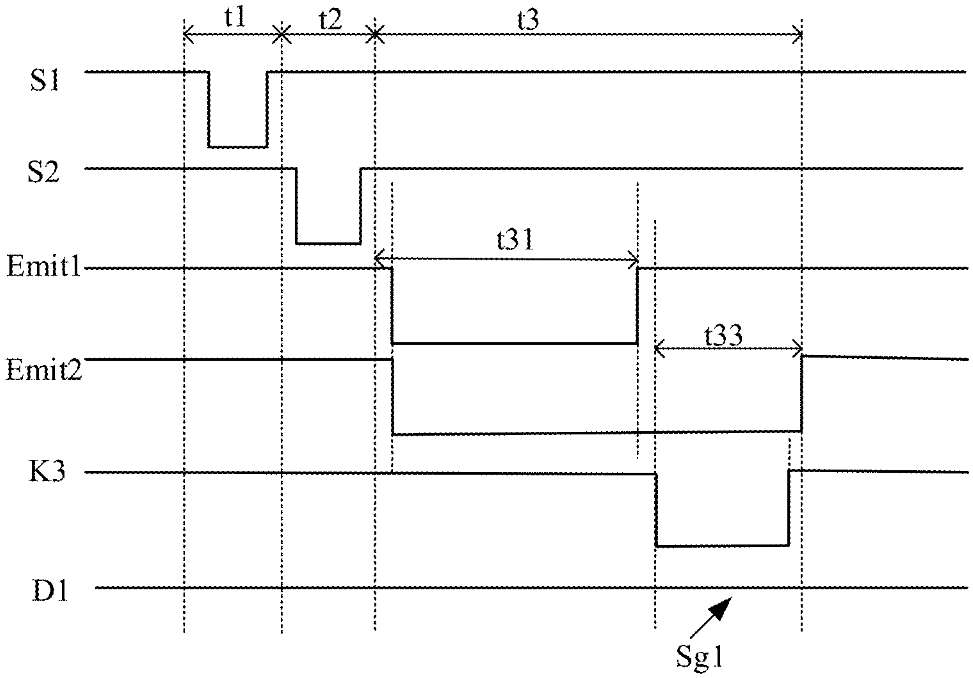
FIG. 22 is another signal timing diagram according to an embodiment of the present disclosure.

In other implementations, FIG. 20 is a schematic diagram of another display panel according to an embodiment of the present disclosure, FIG. 21 is a schematic diagram of another pixel circuit according to an embodiment of the present disclosure, and FIG. 22 is another signal timing diagram according to an embodiment of the present disclosure. FIG. 20 illustrates a region of one first pixel circuit 01. FIG. 21 illustrates the pixel circuit corresponding to the layout in FIG. 20.

With reference to FIG. 20 and FIG. 21, the first pixel circuit 01 includes the first light-emitting control module 10, the second light-emitting control module 20, and a first functional module 61. The first functional module 61 is connected between the first electrode of the drive transistor Tm and a first signal terminal D1. The control terminal of the first light-emitting control module 10 receives the first control signal Emit1, the control terminal of the second light-emitting control module receives the second control signal Emit2, and a control terminal of the first functional module 61 receives a third control signal K3. The first light-emitting control module 10, the second light-emitting control module 20, and the first functional module 61 in the first pixel circuit 01 receive different control signals. The first functional module 61 includes a first transistor T7. A gate of the first transistor T7 is connected to a third control line K3. The third control line K3 provides the third control signal. The first transistor T7 includes a first electrode connected to the first signal terminal D1, and a second electrode connected to the drive transistor Tm. As shown in FIG. 20, the first light-emitting control module 10 is directly connected to the drive transistor Tm. The bridge line 90 includes the first bridge line 91 and a second bridge line 92. The second light-emitting control module 20 is connected to the drive transistor Tm through the first bridge line 91. The first functional module 61 is connected to the drive transistor Tm through the second bridge line 92.

The structure of the layout in FIG. 20 can be understood with reference to FIG. 5. On the basis of FIG. 5, the third control line K3, the first functional module 61, the first signal terminal D1 and the second bridge line 92 are added in FIG. 20. The first signal terminal D1 and the first power terminal Pvdd are located in a same film layer. The second bridge line 92 and the first bridge line 91 are located in a same film layer. FIG. 20 illustrates a fourth via hole V4. The first functional module 61 is connected to the first signal terminal D1 through the fourth via hole V4.

A working cycle of the first pixel circuit 01 is understood with reference to FIG. 22. As can be seen from FIG. 22, in the working cycle of the first pixel circuit 01: The effective pulse width of the first control signal Emit1 is less than the effective pulse width of the second control signal Emit2. In at least one of periods when the first control signal Emit1 provides a non-effective pulse and the second control signal Emit2 provides an effective pulse, the third control signal K3 provides an effective pulse. Specifically, the working cycle of the first pixel circuit 01 includes a gate reset stage t1, a data writing stage t2, and a light-emitting stage t3.

As shown in FIG. 22, in a period t31 of the light-emitting stage t3, an effective pulse of the first control signal Emit1 overlaps with the effective pulse of the second control signal Emit2, both the first light-emitting control module 10 and the second light-emitting control module 20 are turned on, and the first pixel circuit 01 provides a driving current for the first light-emitting device LD1. In at least one of the periods when the first control signal Emit1 provides the non-effective pulse and the second control signal Emit2 provides the effective pulse, namely in a period t33 in FIG. 22, the third control signal K3 provides the effective pulse, such that the first functional module 61 is turned on to write a first signal Sg1 provided by the first signal terminal D1 into the first electrode of the drive transistor Tm. The period t33 is a period when the effective pulse of the second control signal Emit2 overlaps with the effective pulse of the third control signal K3. The first signal Sg1 is a constant voltage signal. A voltage of the first signal Sg1 may be the same as a voltage of a signal provided by the first power terminal Pvdd, and may also be not the same as the voltage of the signal provided by the first power terminal. In the period t33, the first functional module 61 is turned on to write the first signal Sg1 into the first electrode of the drive transistor Tm, the second light-emitting control module 20 is turned on, the drive transistor Tm can generate a driving current, and the first pixel circuit 01 provides the driving current for the first light-emitting device LD1. In the period t31 and the period t33 of the light-emitting stage t3, the first pixel circuit 01 provides the driving current for the first light-emitting device LD1, such that the first light-emitting device LD1 emits light.

In the embodiment, in the first pixel circuit 01, one of the two light-emitting control modules is connected to the drive transistor Tm through the bridge line 90, and the other of the two light-emitting control modules is directly connected to the drive transistor Tm. The control terminals of the two light-emitting control modules can receive different effective pulse widths of the control signals. In addition, the first functional module 61 is connected to the drive transistor Tm through the second bridge line 92. By reasonably providing the position of the first functional module 61, the control terminal of the first functional module 61 and the control terminals of the two light-emitting control modules can receive different control signals. In the implementation, the effective pulse width of the first control signal Emit1 is different from the effective pulse width of the second control signal Emit2, and the first functional module 61 is provided additionally, so a duration when the first pixel circuit 01 provides the driving current is associated with an overlap period for the effective pulse of the first control signal Emit1 and the effective pulse of the second control signal Emit2, and an overlap duration for the effective pulse of the second control signal Emit2 and the effective pulse of the third control signal K3, thereby adjusting a light emission duration of the first light-emitting device LD1 driven by the first pixel circuit 01. As shown in FIG. 20, the display panel includes a first control line Emit1 and a second control line Emit2. The control terminal of the first light-emitting control module 10 is connected to the first control line Emit1. The control terminal of the second light-emitting control module 20 is connected to the second control line Emit2. Along a direction perpendicular to a plane of the display panel, the second bridge line 92 overlaps with the first control line Emit1 in an insulated manner, and overlaps with the second control line Emit2 in an insulated manner. In this way, the first functional module 61 can avoid the first control line Emit1 and the second control line Emit2, the control terminal of the first functional module 61 and the control terminals of the two light-emitting control modules can receive different control signals, and the connection between the first functional module 61 and the drive transistor Tm is ensured.

Figure 23:
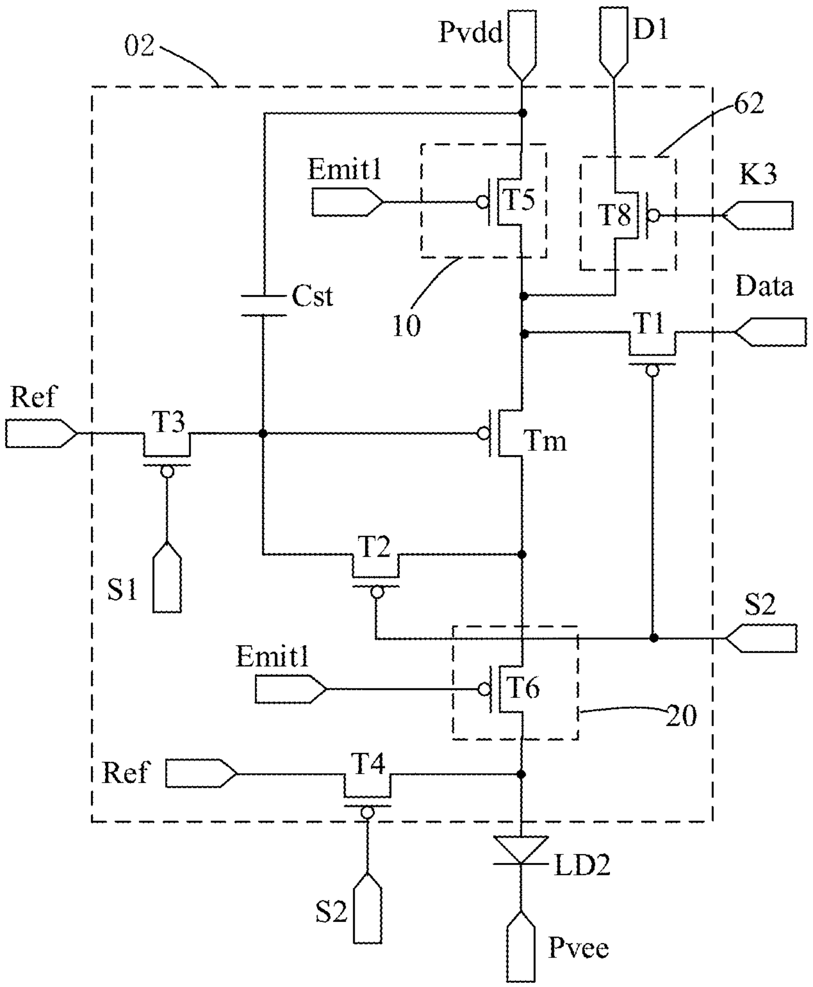
FIG. 23 is a schematic diagram of another display panel according to an embodiment of the present disclosure.
Figure 24:
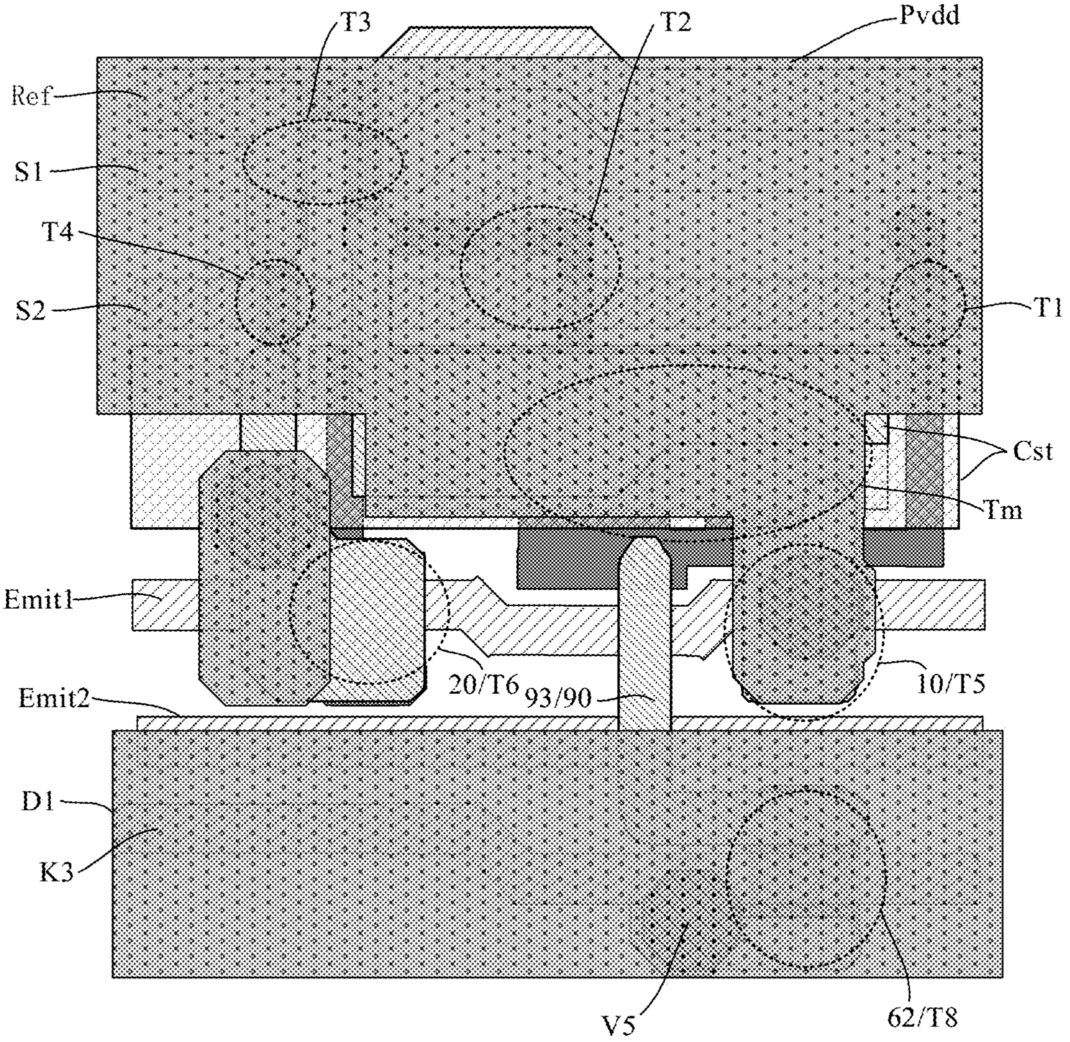
FIG. 24 is a schematic diagram of another pixel circuit according to an embodiment of the present disclosure.

In some implementations, FIG. 23 is a schematic diagram of another display panel according to an embodiment of the present disclosure, and FIG. 24 is a schematic diagram of another pixel circuit according to an embodiment of the present disclosure. FIG. 23 illustrates a region of one second pixel circuit 02. FIG. 24 illustrates the pixel circuit corresponding to the layout in FIG. 23.

With reference to FIG. 23 and FIG. 24, the second pixel circuit 02 includes the first light-emitting control module 10, the second light-emitting control module 20, and a second functional module 62. The second functional module 62 is connected between the first electrode of the drive transistor Tm and the first signal terminal D1. A control terminal of the second functional module 62 and a control terminal of the first functional module 61 in the first pixel circuit 01 receive a same signal. That is, the control terminal of the second functional module 62 receives the third control signal K3. The second functional module 62 includes a second transistor T8. A gate of the second transistor T8 is connected to the third control line K3. The second transistor T8 includes a first electrode connected to the first signal terminal D1, and a second electrode connected to the drive transistor Tm. Both a control terminal of the first light-emitting control module 10 and a control terminal of the second light-emitting control module 20 in the second pixel circuit 02 receive the first control signal Emit1. As shown in FIG. 23, the two light-emitting control modules in the second pixel circuit 02 are directly connected to the drive transistor Tm. The bridge line 90 includes a third bridge line 93. The second functional module 62 is connected to the drive transistor Tm through the third bridge line 93.

The structure of the layout in FIG. 23 can be understood with reference to FIG. 2. On the basis of FIG. 2, the second control line Emit2, the third control line K3, the second functional module 62, the first signal terminal D1 and the third bridge line 93 are added in FIG. 23. The first signal terminal D1 and the first power terminal Pvdd are located in a same film layer. FIG. 23 illustrates a fifth via hole V5. The second functional module 62 is connected to the first signal terminal D1 through the fifth via hole V5.

The second pixel circuit 02 provided by the embodiment of FIG. 23 and FIG. 24 can be driven by the signal timing provided in FIG. 22. As shown in FIG. 22, the working cycle of the second pixel circuit 02 includes a period when the first control signal Emit1 provides a non-effective pulse and the third control signal K3 provides an effective pulse. Specifically, the working cycle of the second pixel circuit 02 includes a gate reset stage t1, a data writing stage t2, and a light-emitting stage t3.

In the working cycle of the second pixel circuit 02, the first light-emitting control module 10 and the second light-emitting control module 20 are turned on only in a period t31 when the first control signal Emit1 provides an effective pulse, such that the second pixel circuit 02 provides a driving current for the second light-emitting device LD2 to emit light. In a period t33, the first control signal Emit1 provides the non-effective pulse and the third control signal K3 provides the effective pulse. In this period, the second functional module 62 is turned on to write a first signal Sg1 provided by the first signal terminal D1 into the first electrode of the drive transistor Tm. In this period, a bias state of the drive transistor Tm can be adjusted with the second functional module 62. Compared with the working cycle of the first pixel circuit 01, a duration when the second pixel circuit 02 provides the driving current is less than a duration when the first pixel circuit 01 provides the driving current, and a light emission duration of the second light-emitting device LD2 is less than a light emission duration of the first light-emitting device LD1.

In the embodiment, the two light-emitting control modules in the second pixel circuit 02 are directly connected to the drive transistor Tm, such that the control terminals of the two light-emitting control modules can receive a same signal. In addition, the second functional module 62 is connected to the drive transistor Tm through the third bridge line 93. By reasonably providing the position of the second functional module 62, the control terminal of the second functional module 62 and the control terminals of the two light-emitting control modules can receive different control signals. In the implementation, the control terminals of the two light-emitting control modules in the second pixel circuit 02 receive the first control signal Emit1, and the effective pulse width of the first control signal Emit1 is less than the effective pulse width of the second control signal Emit2, such that the duration when the second pixel circuit 02 provides the driving current is less than the duration when the first pixel circuit 01 provides the driving current, and the light emission duration of the second light-emitting device LD2 is less than the light emission duration of the first light-emitting device LD1. This can compensate differences of different light-emitting devices in luminous efficiency, and improve the display effect of the display panel. The second functional module 62 is provided in the second pixel circuit 02. In the period when the first control signal Emit1 provides the non-effective pulse and the third control signal K3 provides the effective pulse, the bias state of the drive transistor Tm in the second pixel circuit 02 can be adjusted with the second functional module 62. This reduces differences of the first pixel circuit 01 and the second pixel circuit 02 in the bias state of the drive transistor Tm, reduces differences of the two pixel circuits in the characteristic of the drive transistor Tm, and makes the display more uniform.

As shown in FIG. 24, the display panel includes a first control line Emit1 and a second control line Emit2. Both the control terminal of the first light-emitting control module 10 and the control terminal of the second light-emitting control module 20 in the second pixel circuit 02 are connected to the first control line Emit1. With reference to FIG. 20, in the first pixel circuit 01, the control terminal of the first light-emitting control module 10 is connected to the first control line Emit1, and the control terminal of the second light-emitting control module 20 is connected to the second control line Emit2. Along a direction perpendicular to a plane of the display panel, the third bridge line 93 overlaps with the first control line Emit1 and the second control line Emit2 in an insulated manner. In this way, the second functional module 62 can avoid the first control line Emit1 and the second control line Emit2, the control terminal of the second functional module 62 and the control terminals of the two light-emitting control modules can receive different control signals, and the connection between the second functional module 62 and the drive transistor Tm is ensured.

Figure 25:
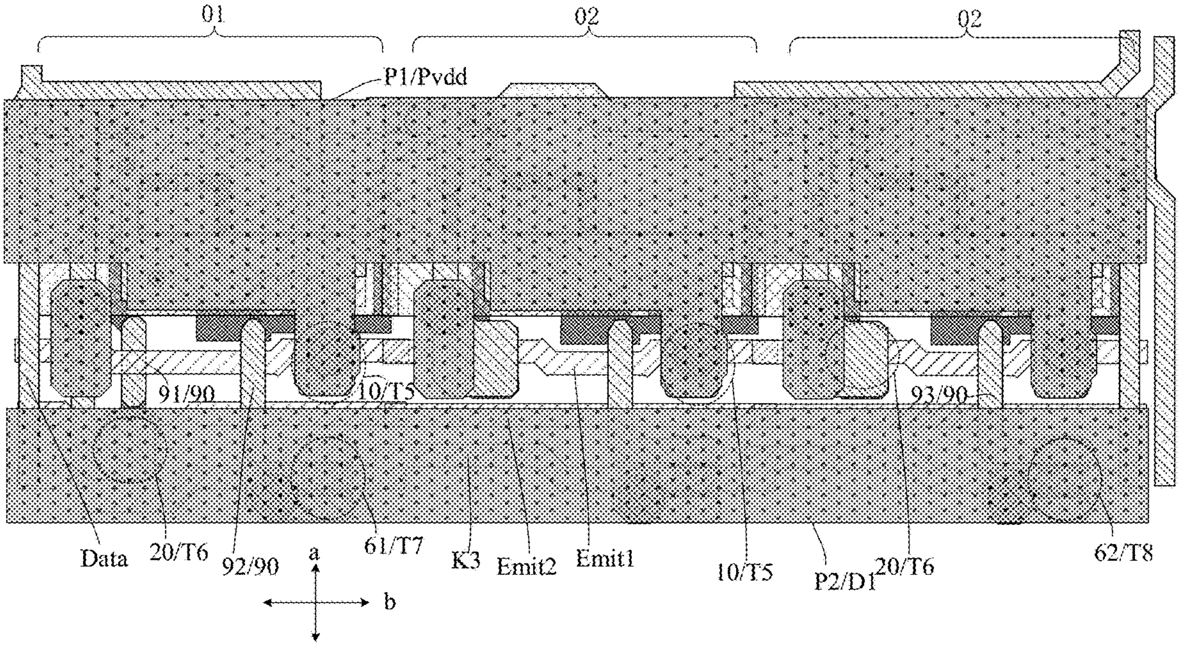
FIG. 25 is a schematic diagram of another display panel according to an embodiment of the present disclosure.

In some implementations, FIG. 25 is a schematic diagram of another display panel according to an embodiment of the present disclosure. FIG. 25 illustrates a pixel region. The pixel region includes one first pixel circuit 01 and two second pixel circuits 02. The first pixel circuit 01 in FIG. 25 corresponds to the first pixel circuit 01 in FIG. 20, and the second pixel circuit 02 in FIG. 25 corresponds to the second pixel circuit 02 in FIG. 24.

As shown in FIG. 25, in the first pixel circuit 01, a control terminal of the first light-emitting control module 10 receives a first control signal Emit1, a control terminal of the second light-emitting control module 20 receives a second control signal Emit2, and an effective pulse width of the first control signal Emit1 is different from an effective pulse width of the second control signal Emit2. In the first pixel circuit 01, one of the first light-emitting control module 10 and the second light-emitting control module 20 is connected to the drive transistor Tm through the bridge line 90, and the other of the first light-emitting control module and the second light-emitting control module is directly connected to the drive transistor Tm. Both a control terminal of the first light-emitting control module 10 and a control terminal of the second light-emitting control module 20 in the second pixel circuit 02 receive the first control signal Emit1. The two light-emitting control modules of the second pixel circuit 02 are directly connected to the drive transistor Tm. The implementation is a design meeting the first solution.

In addition, the second light-emitting control module 20 in the first pixel circuit 01 is connected to the drive transistor Tm through a first bridge line 91. The first pixel circuit 01 further includes a first functional module 61. The first functional module 61 is connected to the drive transistor Tm through a second bridge line 92. The second pixel circuit 02 further includes a second functional module 62. The second functional module 62 is connected to the drive transistor Tm through a third bridge line 93.

The pixel circuit in FIG. 25 can be driven with the signal timing provided by FIG. 22, such that a duration when the second pixel circuit 02 provides a driving current is less than a duration when the first pixel circuit 01 provides a driving current. The second pixel circuit 02 is coupled to a second light-emitting device LD1. The first pixel circuit 01 is coupled to a first light-emitting device LD1. A light emission duration of the second light-emitting device LD2 can be less than a light emission duration of the first light-emitting device LD1.

In the embodiments of present disclosure, in the embodiment of FIG. 25, in the pixel region, the first pixel circuit 01 is coupled to a red light-emitting device. One of the two second pixel circuits 02 is coupled to a green light-emitting device, and the other of the two second pixel circuits is coupled to a blue light-emitting device. When the pixel circuit is driven with the signal timing provided by the embodiment of FIG. 22, the red light-emitting device can have a longer light emission duration to compensate differences of light-emitting devices of different colors in luminous efficiency. The red light-emitting device with lower luminous efficiency can have the longer light emission duration. This can correct the color shift, and improve the displaying effect in applications.

As shown in FIG. 25, the pixel region includes a circuit region. The circuit region includes one first pixel circuit 01 and two second pixel circuits 02. The three pixel circuits in the pixel region are arranged along a second direction b. The pixel region includes a first power connecting plate P1 and a first signal connecting plate P2. The first power connecting plate P1 serves as the first power terminal Pvdd. The first signal connecting plate P2 serves as a first signal terminal D1. The first power connecting plate P1 overlaps with and is electrically connected to the first light-emitting control module 10. The first power connecting plate P1 serves as the first power terminal Pvdd. The manner for connecting the first power connecting plate and the first light-emitting control module 10 may refer to descriptions on the embodiment of FIG. 2. The first signal connecting plate P2 overlaps with and is electrically connected to the first functional module 61. The first signal connecting plate P2 further overlaps with and is electrically connected to the second functional module 62. The first signal connecting plate P2 serves as the first signal terminal D1. The manner for connecting the first signal connecting plate and the first functional module 61 may refer to descriptions on the embodiment of FIG. 20. The manner for connecting the first signal connecting plate and the second functional module 62 may refer to descriptions on the embodiment of FIG. 24.

Figure 26:
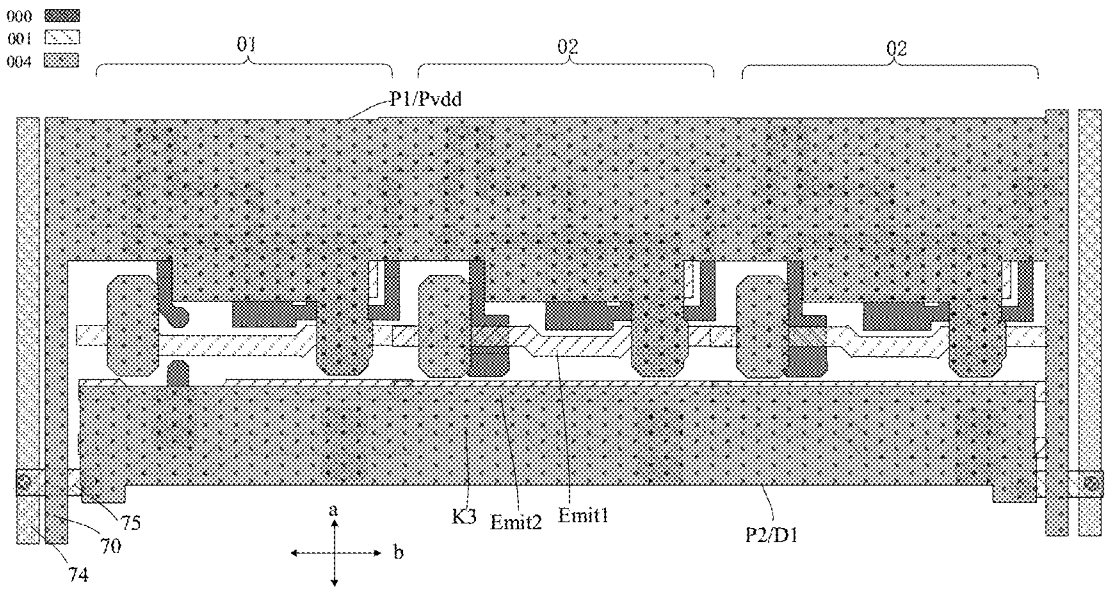
FIG. 26 is a simplified schematic diagram of another display panel according to an embodiment of the present disclosure.

FIG. 25 illustrates a data line Data extending along a first direction a. The display panel further includes a first power line and a first signal line that extend along the first direction, which is not shown in FIG. 25, and can be understood with reference to FIG. 26. FIG. 26 is a simplified schematic diagram of another display panel according to an embodiment of the present disclosure. FIG. 26 only illustrates the semiconductor layer 000, the first metal layer 001 and the fourth metal layer 004 in one pixel region, and illustrates the first power connecting plate P1, the first signal connecting plate P2, the first power line 70 and the first signal line 74. As shown in FIG. 26, the first power line 70 and the first signal line 74 extend along the first direction a, the first power connecting plate P1 is connected to the first power line 70, and the first signal connecting plate P2 is connected to the first signal line 74. With reference to descriptions on the embodiment of FIG. 18, a plurality of first power connecting plates P1 and a plurality of first signal connecting plates P2 are arranged in a plurality of pixel regions in the display panel. The plurality of first power connecting plates P1 can be connected to a plurality of first power lines 70 mutually to form a latticed wiring. This can reduce a voltage drop of a power signal in transmission. Correspondingly, the plurality of first signal connecting plates P2 can be connected to a plurality of first signal lines 74 mutually to form a latticed wiring. This can also reduce a voltage drop of a signal transmitted on the first signal line 74.

In the embodiments of present disclosure, as shown in FIG. 26, the first signal connecting plate P2, the first power connecting plate P1 and the first power line 70 are located in the fourth metal layer 004. The first signal line 74 and the first signal connecting plate P2 are located in different layers. The first signal line 74 is connected to the first signal connecting plate P2 through a connecting line 75. In the embodiments of present disclosure, the connecting line 75 may be located in a same layer as the reset signal line. That is, the connecting line 75 is located in the second metal layer 002.

In some implementations, the first power line 70 and the first signal line 74 are located between adjacent pixel regions in the second direction b. The first power line 70 and the first signal line 74 are located in different layers. A light-shielding layer is provided on the display panel, which may refer to descriptions on the light-shielding layer in the embodiment of FIG. 19. The light-shielding layer is located between the substrate 00 and the semiconductor layer 000. The light-shielding layer is configured to shade light to prevent current leakage of the channel in the semiconductor layer 000. The first signal line 74 is located in a same layer as the light-shielding layer. The implementation can be applied to the transparent display panel. The first signal line 74 is manufactured in a same layer as the light-shielding layer, which does not increase the manufacturing process. The first signal line 74 does not affect original arrangement of the first power line 70.

In some implementations, the light-shielding layer may be electrically connected to the first signal line 74. When the first signal line 74 transmits a constant voltage signal, the light-shielding layer can further take a shielding effect at a side of the semiconductor layer 000 close to the substrate.

Figure 27:
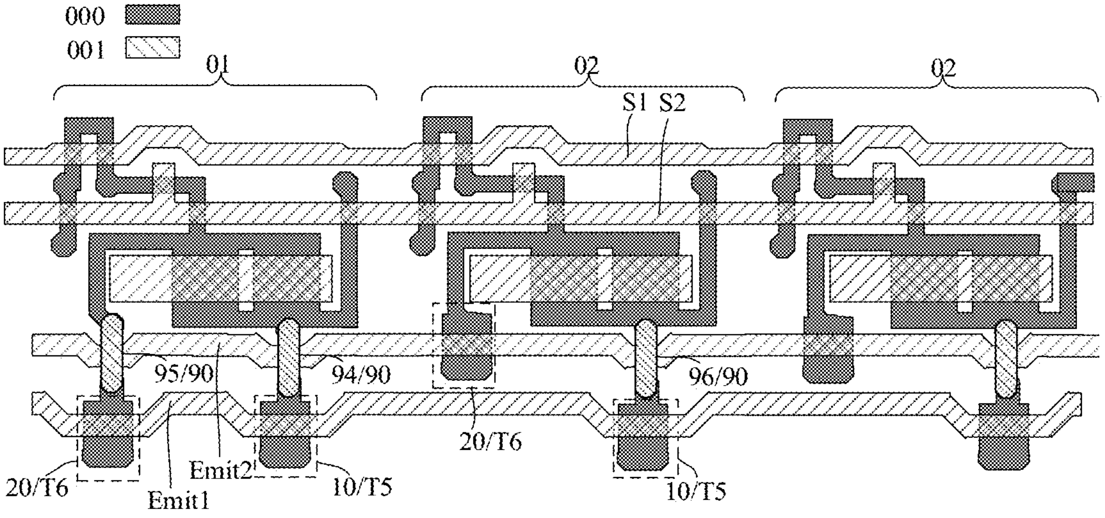
FIG. 27 is a schematic diagram of another display panel according to an embodiment of the present disclosure.
Figure 28:
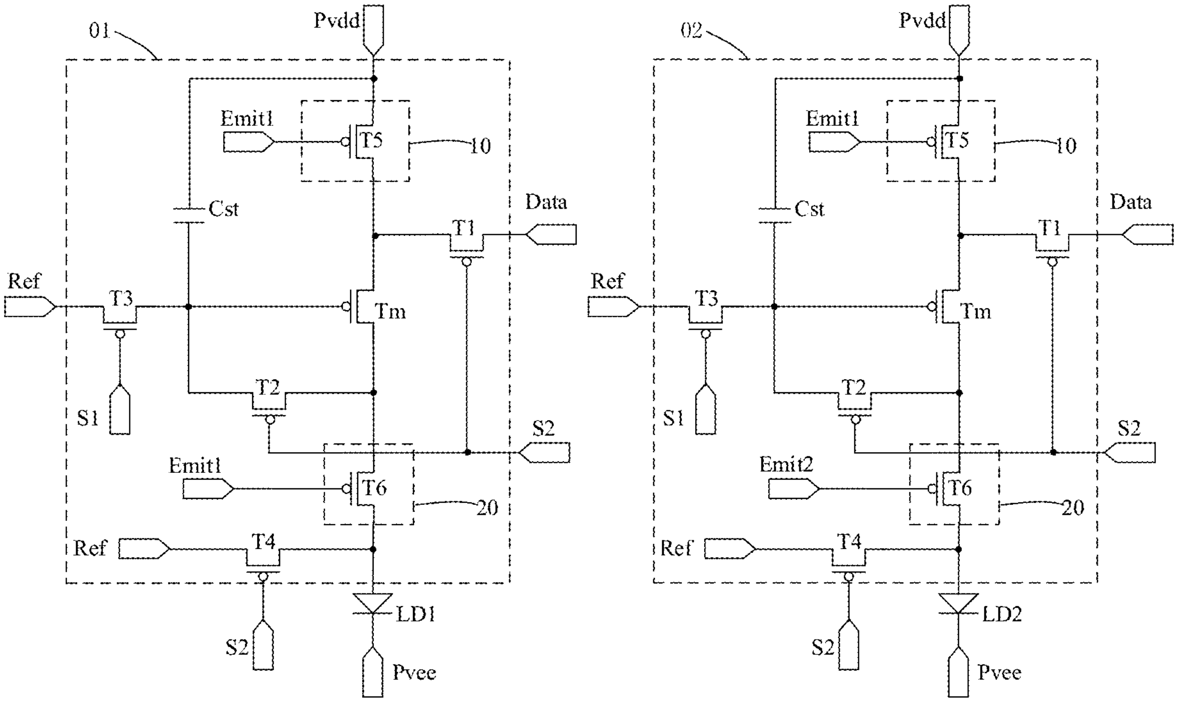
FIG. 28 is a schematic diagram of another pixel circuit according to an embodiment of the present disclosure.

In some implementations, FIG. 27 is a schematic diagram of another display panel according to an embodiment of the present disclosure. FIG. 27 illustrates a pixel region. The pixel region includes one first pixel circuit 01 and two second pixel circuits 02. FIG. 28 is a schematic diagram of another pixel circuit according to an embodiment of the present disclosure. FIG. 27 is a layout corresponding to the pixel circuit in FIG. 28. FIG. 27 only illustrates the structure of the first pixel circuit 01 and the second pixel circuit 02 simply, only illustrates the semiconductor layer 000, the first metal layer 001 and the corresponding bridge line 90, and labels a position of each light-emitting control module.

As shown in FIG. 27 and FIG. 28, both a control terminal of the first light-emitting control module 10 and a control terminal of the second light-emitting control module 20 in the first pixel circuit 01 receive a first control signal Emit1. In the second pixel circuit 02, a control terminal of the first light-emitting control module 10 receives the first control signal Emit1, and a control terminal of the second light-emitting control module 20 receives a second control signal Emit2. As shown in FIG. 27, the first light-emitting control module 10 and the second light-emitting control module 20 in the first pixel circuit 01 are connected to the drive transistor Tm through the bridge line 90. In the second pixel circuit 02, the first light-emitting control module 10 is connected to the drive transistor Tm through the bridge line 90, and the second light-emitting control module 20 is directly connected to the drive transistor Tm. The embodiment is a design meeting the second solution.

The pixel circuit provided by the embodiment of FIG. 27 and FIG. 28 may be driven with the signal timing in FIG. 7. The effective pulse width of the first control signal Emit1 is different from the effective pulse width of the second control signal Emit2, and the effective pulse width of the first control signal Emit1 is greater than the effective pulse width of the second control signal Emit2. A working cycle of the first pixel circuit 01 and a working cycle of the second pixel circuit 02 each include a gate reset stage t1, a data writing stage t2, and a light-emitting stage t3.

In the light-emitting stage t3 of the working cycle of the second pixel circuit 02: The effective pulse of the first control signal Emit1 overlaps with the effective pulse of the second control signal Emit2 in a period t31. In a period t32, the first control signal Emit1 is an effective level, and the second control signal Emit2 is a non-effective level. In the period t31, both the first light-emitting control module 10 and the second light-emitting control module 20 in the second pixel circuit 02 are turned on, and the second pixel circuit 02 provides a driving current for the second light-emitting device LD2 to emit light.

In the working cycle of the first pixel circuit 01, in the period t31 and the period t32, the first control signal Emit1 provides an effective pulse, and the first light-emitting control module 10 and the second light-emitting control module 20 in the first pixel circuit 01 are turned on. In the period t31 and the period t32, the first pixel circuit 01 provides a driving current for the first light-emitting device LD1 to emit light. When the signal timing provided by the embodiment of FIG. 7 is used for driving, a light emission duration of the first light-emitting device LD1 can be longer than a light emission duration of the second light-emitting device LD2.

In the implementation, by connecting the two light-emitting control modules and the drive transistor Tm in the first pixel circuit 01 and the second pixel circuit 02 in different manners, and reasonably arranging the two light-emitting control modules in the pixel circuits, the light-emitting control modules in the two pixel circuits can receive a control signal in different manners. The effective pulse width of the first control signal Emit is different from the effective pulse width of the second control signal Emit2, so the duration when the second pixel circuit 02 provides the driving current is associated with an overlap period for the effective pulses of the two control signals, and the duration when the first pixel circuit 01 provides the driving current is only associated with the effective pulse width of the first control signal Emit1. Therefore, the duration when the first pixel circuit 01 provides the driving current is longer than the duration when the second pixel circuit 02 provides the driving current, and the light emission duration of the first light-emitting device LD1 driven by the first pixel circuit 01 is greater than the light emission duration of the second light-emitting device LD2 driven by the second pixel circuit 02. This can compensate differences of different light-emitting devices in luminous efficiency, and improve the display effect of the display panel. In some implementations, in the embodiment of FIG. 27, the first pixel circuit 01 is coupled to a red light-emitting device. One of the two second pixel circuits 02 is coupled to a green light-emitting device, and the other of the two second pixel circuits is coupled to a blue light-emitting device. That is, in the embodiment of FIG. 28, the first light-emitting device LD1 emits red light, and the second light-emitting device LD2 emits green light or blue light. When the pixel circuit is driven with the signal timing provided by the embodiment of FIG. 7, the red light-emitting device can have a longer light emission duration to compensate differences of light-emitting devices of different colors in luminous efficiency. The red light-emitting device with lower luminous efficiency can have the longer light emission duration. This can correct the color shift, and improve the display effect in applications.

As shown in FIG. 27, the display panel includes a first control line Emit1 and a second control line Emit2. A control terminal of the first light-emitting control transistor T5 in the second pixel circuit 02 is connected to the first control line Emit1. A control terminal of the second light-emitting control transistor T6 in the second pixel circuit 02 is connected to the second control line Emit2. Both a control terminal of the first light-emitting control transistor T5 and a control terminal of the second light-emitting control transistor T6 in the first pixel circuit 01 are connected to the first control line Emit1. The first control line Emit1 is located at a side of the second control line Emit2 away from the drive transistor Tm.

The bridge line 90 includes a fourth bridge line 94, a fifth bridge line 95, and a sixth bridge line 96. In the first pixel circuit 01, the first light-emitting control module 10 is connected to the drive transistor Tm through the fourth bridge line 94, and the second light-emitting control module 20 is connected to the drive transistor Tm through the fifth bridge line 95. The first light-emitting control module 10 in the second pixel circuit 02 is connected to the drive transistor Tm through the sixth bridge line 96. Along a direction perpendicular to a plane of the display panel, the fourth bridge line 94 overlaps with the second control line Emit2 in an insulated manner, the fifth bridge line 95 overlaps with the second control line Emit2 in an insulated manner, and the sixth bridge line 96 overlaps with the second control line Emit2 in an insulated manner. In this way, the first light-emitting control transistor T5 in the second pixel circuit 02 can avoid the second control line Emit2, and the two light-emitting control modules in the second pixel circuit 02 are respectively controlled by the first control line Emit1 and the second control line Emit2. Meanwhile, the two light-emitting control modules in the first pixel circuit 01 avoid the second control line Emit2, and the two light-emitting control modules in the first pixel circuit 01 are controlled by the first control line Emit1. By connecting the two light-emitting control modules and the drive transistor in the first pixel circuit 01 and the second pixel circuit 02 in different manners, and reasonably arranging the two light-emitting control modules in the pixel circuits, the light-emitting control modules in the two pixel circuits can receive a control signal in different manners, and requirements on line connection in the pixel circuits are met.

Figure 29:
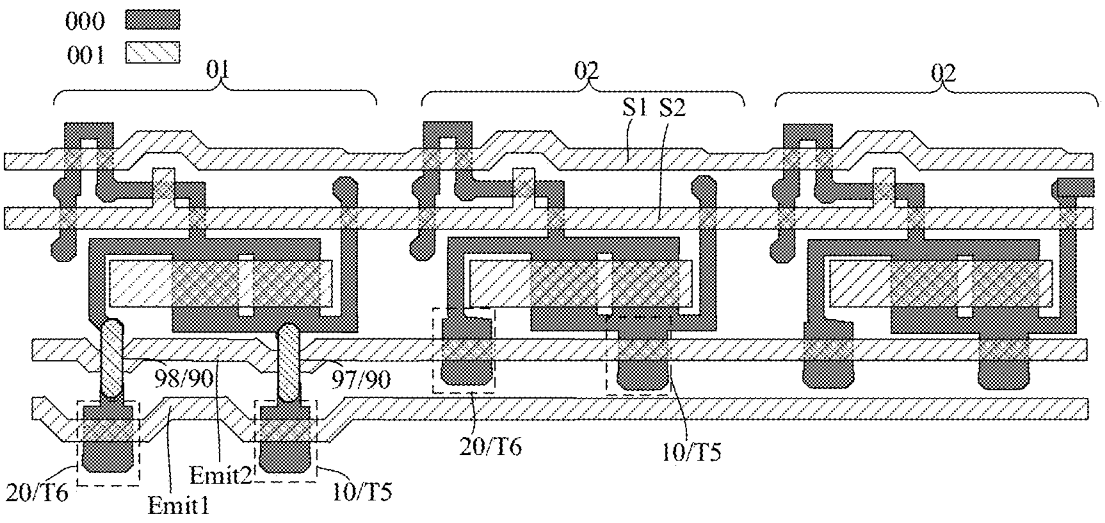
FIG. 29 is a schematic diagram of another display panel according to an embodiment of the present disclosure.
Figure 30:
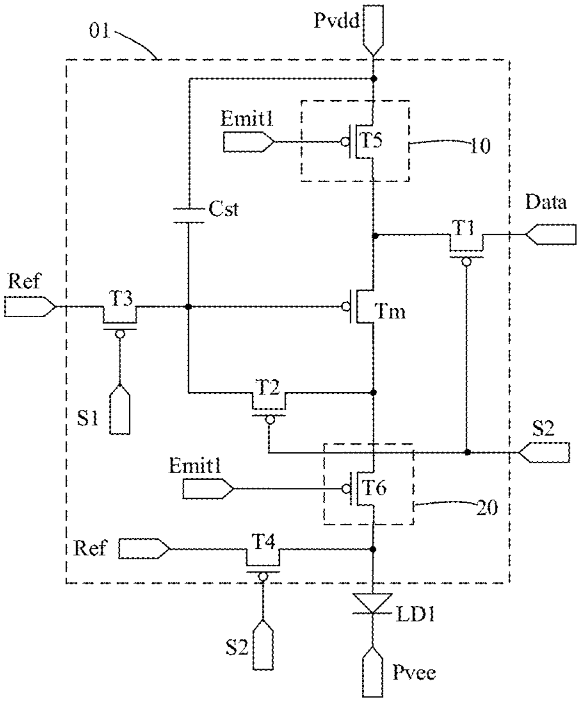
FIG. 30 is a schematic diagram of another pixel circuit according to an embodiment of the present disclosure.

In some implementations, FIG. 29 is a schematic diagram of another display panel according to an embodiment of the present disclosure. FIG. 29 illustrates a pixel region. The pixel region includes two first pixel circuits 01 and one second pixel circuit 02. FIG. 30 is a schematic diagram of another pixel circuit according to an embodiment of the present disclosure. FIG. 29 is a layout corresponding to the pixel circuit in FIG. 30. FIG. 29 only illustrates the structure of the first pixel circuit 01 and the second pixel circuit 02 simply, only illustrates the semiconductor layer 000, the first metal layer 001 and the corresponding bridge line 90, and labels a position of each light-emitting control module.

As shown in FIG. 29 and FIG. 30, in the first pixel circuit 01, a control terminal of the first light-emitting control module 10 receives a first control signal Emit1, and a control terminal of the second light-emitting control module 20 receives the first control signal Emit1. In the second pixel circuit 02, a control terminal of the first light-emitting control module 10 receives a second control signal Emit2, and a control terminal of the second light-emitting control module 20 receives the second control signal Emit2. An effective pulse width of the first control signal Emit1 is different from an effective pulse width of the second control signal Emit2.

As shown in FIG. 29, in the first pixel circuit 01, the first light-emitting control module 10 is connected to the drive transistor Tm through the bridge line 90, and the second light-emitting control module 20 is connected to the drive transistor Tm through the bridge line 90. In the second pixel circuit 02, the first light-emitting control module 10 is directly connected to the drive transistor Tm, and the second light-emitting control module 20 is directly connected to the drive transistor Tm. The first light-emitting control module 10 includes the first light-emitting control transistor T5, and the second light-emitting control module 20 includes the second light-emitting control transistor T6. The embodiment is a design meeting the third solution.

The pixel circuit provided by the embodiment of FIG. 29 and FIG. 30 may be driven with the signal timing in FIG. 7. The effective pulse width of the first control signal Emit1 is different from the effective pulse width of the second control signal Emit2, and the effective pulse width of the first control signal Emit1 is greater than the effective pulse width of the second control signal Emit2. A working cycle of the first pixel circuit 01 and a working cycle of the second pixel circuit 02 each include a gate reset stage t1, a data writing stage t2, and a light-emitting stage t3.

In the working cycle of the first pixel circuit 01, in the light-emitting stage t3, in a period when the first control signal Emit1 provides an effective pulse, the first light-emitting control module 10 and the second light-emitting control module 20 in the first pixel circuit 01 are turned on, and the first pixel circuit 01 provides a driving current for the first light-emitting device LD1 to emit light. In the working cycle of the second pixel circuit 02, in the light-emitting stage t3, in a period when the second control signal Emit2 provides an effective pulse, the first light-emitting control module 10 and the second light-emitting control module 20 in the second pixel circuit 02 are turned on, and the second pixel circuit 02 provides a driving current for the second light-emitting device LD2 to emit light. The effective pulse width of the first control signal Emit1 is greater than the effective pulse width of the second control signal Emit2. When the signal timing provided by the embodiment of FIG. 7 is used for driving, a duration when the first pixel circuit 01 provides the driving current is longer than a duration when the second pixel circuit 02 provides the driving current, and a light emission duration of the first light-emitting device LD1 is longer than a light emission duration of the second light-emitting device LD2.

In the implementation, by connecting the two light-emitting control modules and the drive transistor Tm in the first pixel circuit 01 and the second pixel circuit 02 in different manners, and reasonably arranging the two light-emitting control modules in the pixel circuits, the light-emitting control modules in the two pixel circuits can receive a control signal in different manners. The effective pulse width of the first control signal Emit1 is different from the effective pulse width of the second control signal Emit2, so the duration when the second pixel circuit 02 provides the driving current is associated with the effective pulse width of the second control signal Emit2, and the duration when the first pixel circuit 01 provides the driving current is only associated with the effective pulse width of the first control signal Emit1. Therefore, the duration when the first pixel circuit 01 provides the driving current is longer than the duration when the second pixel circuit 02 provides the driving current, and the light emission duration of the first light-emitting device LD1 driven by the first pixel circuit 01 is longer than the light emission duration of the second light-emitting device LD2 driven by the second pixel circuit 02. This can compensate differences of different light-emitting devices in luminous efficiency, and improve the display effect of the display panel. In some implementations, in the embodiment of FIG. 29, the first pixel circuit 01 is coupled to a red light-emitting device. One of the two second pixel circuits 02 is coupled to a green light-emitting device, and the other of the two second pixel circuits is coupled to a blue light-emitting device. That is, in the embodiment of FIG. 30, the first light-emitting device LD1 emits red light, and the second light-emitting device LD2 emits green light or blue light. When the pixel circuit is driven with the signal timing provided by the embodiment of FIG. 7, the red light-emitting device can have a longer light emission duration to compensate differences of light-emitting devices of different colors in luminous efficiency. The red light-emitting device with lower luminous efficiency has longer light emission duration. This design can be used to correct the color shift, and improve the display effect in applications.

In some implementations, as shown in FIG. 29, the display panel includes a first control line Emit1 and a second control line Emit2. Both the control terminal of the first light-emitting control module 10 and the control terminal of the second light-emitting control module 20 in the first pixel circuit 01 are connected to the first control line Emit1. Both the control terminal of the first light-emitting control module 10 and the control terminal of the second light-emitting control module 20 in the second pixel circuit 02 are connected to the second control line Emit2. The bridge line 90 includes a seventh bridge line 97 and an eighth bridge line 98. In the first pixel circuit 01, the first light-emitting control module 10 is connected to the drive transistor Tm through the seventh bridge line 97, and the second light-emitting control module 20 is connected to the drive transistor Tm through the eighth bridge line 98. Along a direction perpendicular to a plane of the display panel, the seventh bridge line 97 overlaps with the second control line Emit2 in an insulated manner, and the eighth bridge line 98 overlaps with the second control line Emit2 in an insulated manner. In this way, the first light-emitting control transistor T5 and the second light-emitting control transistor T6 in the first pixel circuit 01 can avoid the second control line Emit2, the two light-emitting control modules in the first pixel circuit 01 are controlled by the first control line Emit1, and the two light-emitting control modules in the second pixel circuit 02 are controlled by the first control line Emit1. By connecting the two light-emitting control modules and the drive transistor in the first pixel circuit 01 and the second pixel circuit 02 in different manners, and reasonably arranging the two light-emitting control modules in the pixel circuits, the light-emitting control modules in the two pixel circuits can receive a control signal in different manners, and requirements on line connection in the pixel circuits are met.

In other implementations, in the first pixel circuit 01, a control terminal of the first light-emitting control module 10 receives a first control signal Emit1, and a control terminal of the second light-emitting control module 20 receives the first control signal Emit1. In the second pixel circuit 02, a control terminal of the first light-emitting control module 10 receives a second control signal Emit2, and a control terminal of the second light-emitting control module 20 receives the second control signal Emit2. An effective pulse width of the first control signal Emit1 is different from an effective pulse width of the second control signal Emit2. The effective pulse width of the first control signal Emit1 is less than the effective pulse width of the second control signal Emit2. A duration for providing the driving current in a working cycle of the first pixel circuit 01 is less than a duration for providing the driving current in a working cycle of the second pixel circuit 02. In applications, the first light-emitting device coupled to the first pixel circuit 01 emits green light or blue light, and the light-emitting device coupled to the second pixel circuit 02 emits red light. The red light-emitting device has a longer light emission duration. This can compensate differences of the light-emitting devices of different colors in luminous efficiency, correct the color shift, and improve the display effect in applications.

Figure 31:
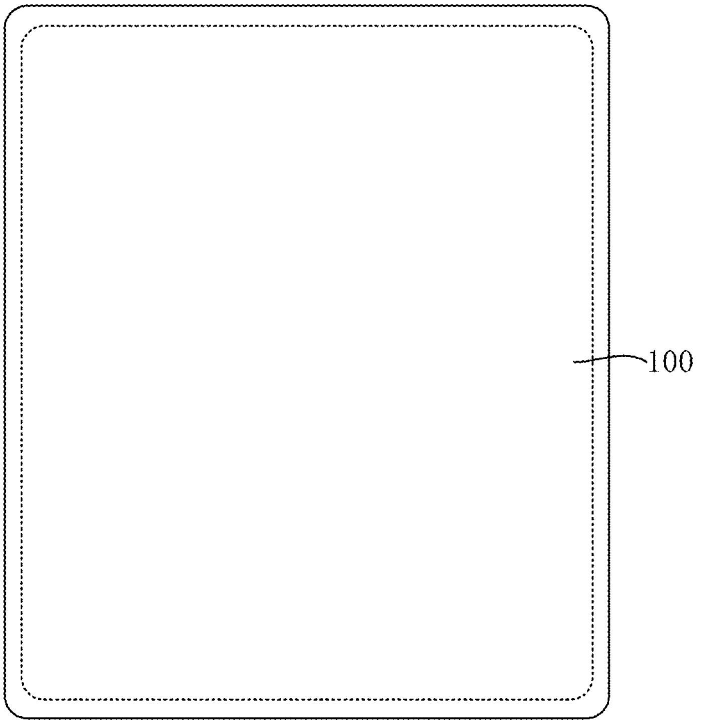
FIG. 31 is a schematic diagram of a display apparatus according to an embodiment of the present disclosure.

Based on a same inventive concept, an embodiment of the present disclosure further provides a display apparatus. FIG. 31 is a schematic diagram of a display apparatus according to an embodiment of the present disclosure. As shown in FIG. 31, the display apparatus includes the display panel 100 provided in any embodiment of the present disclosure. The structure of the display panel has been described in the foregoing embodiments, and details are not repeated. The display apparatus provided in the embodiment of the present disclosure may be, for example, an electronic device such as a mobile phone, a computer, a tablet, a television, and a transparent display device.

The above descriptions are merely preferred embodiments of the present disclosure, and are not intended to limit the present disclosure. Any modifications, equivalent replacements, improvements, and the like made within the spirit and principle of the present disclosure shall fall within the protection scope of the present disclosure.

Finally, it should be noted that the foregoing embodiments are merely intended to describe and not to limit the technical solutions of the present disclosure. Although the present disclosure has been described in detail with reference to the foregoing embodiments, persons skilled in the art should understand that they can still make modifications to the technical solutions described in the foregoing embodiments or make equivalent replacements to some or all of the technical features thereof. These modifications or replacements do not make the essence of the corresponding technical solutions deviate from the scope of the technical solutions of the embodiments of the present disclosure.

What is claimed is:

1. A display panel, comprising pixel circuits and light-emitting devices, wherein one of the pixel circuits comprises a drive transistor, a first light-emitting control module, and a second light-emitting control module; one of the first light-emitting control module and the second light-emitting control module is connected between a first power terminal and a first electrode of the drive transistor, and the other of the first light-emitting control module and the second light-emitting control module is connected between a second electrode of the drive transistor and the light-emitting device;

the pixel circuits comprise a first pixel circuit and a second pixel circuit, and the display panel comprises a bridge line; and at least one of the first light-emitting control module and the second light-emitting control module in the first pixel circuit is connected to the drive transistor through the bridge line; and at least one of the first light-emitting control module and the second light-emitting control module in the second pixel circuit is directly connected to the drive transistor.

2. The display panel according to claim 1, wherein in the first pixel circuit, a control terminal of the first light-emitting control module receives a first control signal, and a control terminal of the second light-emitting control module receives a second control signal; and an effective pulse width of the first control signal is different from an effective pulse width of the second control signal; and in the first pixel circuit, the first light-emitting control module is directly connected to the drive transistor, and the second light-emitting control module is connected to the drive transistor through the bridge line.

3. The display panel according to claim 2, further comprising a first control line and a second control line; the control terminal of the first light-emitting control module is connected to the first control line; and the control terminal of the second light-emitting control module is connected to the second control line; and the bridge line comprises a first bridge line; and the second light-emitting control module in the first pixel circuit is connected to the drive transistor through the first bridge line.

4. The display panel according to claim 3, wherein along a direction perpendicular to a plane of the display panel, the first bridge line overlaps with the first control line in an insulated manner;

wherein the first bridge line is connected to the drive transistor through a first via hole; and the first bridge line is connected to the second light-emitting control module through a second via hole; and along a direction parallel to the plane of the display panel, a distance d1 from the first via hole to the first control line is equal to or greater than 2.5 μm, and/or a distance d2 from the second via hole to the first control line is equal to or greater than 2.5 μm.

5. The display panel according to claim 3, wherein the second control line comprises a first wiring portion which is adjacent to the first light-emitting control module in the first pixel circuit; the display panel further comprises a semiconductor layer; and the first light-emitting control module in the first pixel circuit comprises a first electrode region located in the semiconductor layer and close to one side of the first wiring portion; and along a direction parallel to a plane of the display panel, a distance d3 from the first wiring portion to the first electrode region is equal to or greater than 1.5 μm.

6. The display panel according to claim 3, further comprising:

a semiconductor layer; and a first connection electrode;

wherein the second light-emitting control module in the first pixel circuit comprises a gate and an active layer;

the active layer is located in the semiconductor layer; the active layer comprises a second electrode region, a channel, and a third electrode region arranged along a first direction; at least part of wiring in the second control line is reused as the gate; and the channel is formed in a portion of the active layer overlapping with the gate; and the first connection electrode comprises one terminal connected to the second electrode region through a via hole, and the other terminal covering the channel and partially overlapping with the third electrode region; and a length of the first connection electrode beyond the channel along the first direction is defined as d4, d4≥1 μm.

7. The display panel according to claim 2, wherein in the second pixel circuit, a control terminal of the first light-emitting control module and a control terminal of the second light-emitting control module receive the first control signal, respectively; and in the second pixel circuit, the first light-emitting control module is directly connected to the drive transistor, and the second light-emitting control module is directly connected to the drive transistor.

8. The display panel according to claim 7, wherein the display panel further comprises a first control line and a second control line; the control terminal of the first light-emitting control module in the first pixel circuit is connected to the first control line; and the control terminal of the second light-emitting control module in the first pixel circuit is connected to the second control line;

the second control line comprises a second wiring portion and a third wiring portion; the second wiring portion is adjacent to the second light-emitting control module in the second pixel circuit; and the third wiring portion is adjacent to the first light-emitting control module in the second pixel circuit; and the display panel further comprises a semiconductor layer; the second light-emitting control module in the second pixel circuit comprises a fourth electrode region located in the semiconductor layer and close to one side of the second wiring portion; the first light-emitting control module in the second pixel circuit comprises a fifth electrode region located in the semiconductor layer and close to one side of the third wiring portion; and along a direction parallel to a plane of the display panel, a distance d5 from the second wiring portion to the fourth electrode region is equal to or greater than 1.5 μm, and/or a distance d6 from the third wiring portion to the fifth electrode region is equal to or greater than 1.5 μm.

9. The display panel according to claim 7, wherein the effective pulse width of the first control signal is greater than the effective pulse width of the second control signal; and in a working cycle of the first pixel circuit, an effective pulse period of the second control signal overlaps with an effective pulse period of the first control signal.

10. The display panel according to claim 7, further comprising:

a first control line;

a second control line;

a pixel region;

a substrate; and insulation layers located at one side of the substrate;

wherein the control terminal of the first light-emitting control module in the first pixel circuit is connected to the first control line; and the control terminal of the second light-emitting control module in the second pixel circuit is connected to the second control line;

wherein the pixel region comprises a circuit region and a transmission region; and the circuit region comprises two first pixel circuits and one second pixel circuit; and wherein at least one of the insulation layers in the transmission region is provided with a hollow; the second control line is adjacent to the transmission region; and a distance d7 from the second control line to the transmission region is equal to or greater than ≥5.5 μm.

11. The display panel according to claim 7, further comprising:

a pixel region;

a substrate; and insulation layers located at one side of the substrate;

wherein the pixel region comprises a circuit region and a transmission region; and the circuit region comprises two first pixel circuits and one second pixel circuit;

at least one of the insulation layers in the transmission region is provided with a hollow; and the transmission region is provided with a recess; and the second light-emitting control module in the first pixel circuit is opposite to the recess.

12. The display panel according to claim 11, further comprising a light-shielding layer and a semiconductor layer, wherein the light-shielding layer is located between the substrate and the semiconductor layer; and an orthographic projection of the light-shielding layer on the substrate covers an orthographic projection of the semiconductor layer on the substrate; and the light-shielding layer comprises a first portion; along a direction perpendicular to a plane of the display panel, the first portion overlaps with the semiconductor layer in the second light-emitting control module of the first pixel circuit; the first portion is partially opposite to the recess; and a distance d8 from the first portion to the transmission region is equal to or greater than 4.7 μm.

13. The display panel according to claim 11, further comprising a first control line and a second control line, wherein the control terminal of the first light-emitting control module in the first pixel circuit is connected to the first control line; and the control terminal of the second light-emitting control module in the first pixel circuit is connected to the second control line; and the second control line is adjacent to the transmission region; and a corner of the recess adjacent to the second control line is a chamfer; or the display panel further comprises a first control line and a second control line, wherein the first control line is located at a side of the second control line close to the first pixel circuit.

14. The display panel according to claim 2, wherein the light-emitting devices comprise a first light-emitting device and a second light-emitting device; the first light-emitting device is coupled to the first pixel circuit; and the second light-emitting device is coupled to the second pixel circuit; and the first light-emitting device emits green light or blue light, and the second light-emitting device emits red light.

15. The display panel according to claim 1, wherein a control terminal of the first light-emitting control module and a control terminal of the second light-emitting control module in the first pixel circuit receive a first control signal, respectively; and in the second pixel circuit, a control terminal of the first light-emitting control module receives the first control signal, and a control terminal of the second light-emitting control module receives a second control signal;

the first light-emitting control module and the second light-emitting control module in the first pixel circuit are connected to the drive transistor through the bridge line; and in the second pixel circuit, the first light-emitting control module is connected to the drive transistor through the bridge line, and the second light-emitting control module is directly connected to the drive transistor.

16. The display panel according to claim 15, further comprising a first control line and a second control line, wherein the first light-emitting control module comprises a first light-emitting control transistor, the second light-emitting control module comprises a second light-emitting control transistor; and a control terminal of the first light-emitting control transistor in the second pixel circuit is connected to the first control line; and a control terminal of the second light-emitting control transistor in the second pixel circuit is connected to the second control line;

the bridge line comprises a fourth bridge line, a fifth bridge line, and a sixth bridge line;

in the first pixel circuit, the first light-emitting control module is connected to the drive transistor through the fourth bridge line, and the second light-emitting control module is connected to the drive transistor through the fifth bridge line; and the first light-emitting control module in the second pixel circuit is connected to the drive transistor through the sixth bridge line; and along a direction perpendicular to a plane of the display panel, the fourth bridge line overlaps with the second control line in an insulated manner, the fifth bridge line overlaps with the second control line in an insulated manner, and the sixth bridge line overlaps with the second control line in an insulated manner.

17. The display panel according to claim 1, wherein in the first pixel circuit, a control terminal of the first light-emitting control module receives a first control signal, and a control terminal of the second light-emitting control module receives the first control signal; and in the second pixel circuit, a control terminal of the first light-emitting control module receives a second control signal, and a control terminal of the second light-emitting control module receives the second control signal; and in the first pixel circuit, the first light-emitting control module is connected to the drive transistor through the bridge line, and the second light-emitting control module is connected to the drive transistor through the bridge line; and in the second pixel circuit, the first light-emitting control module is directly connected to the drive transistor, and the second light-emitting control module is directly connected to the drive transistor.

18. The display panel according to claim 17, further comprising a first control line and a second control line, wherein in the first pixel circuit, the control terminal of the first light-emitting control module is connected to the first control line, and the control terminal of the second light-emitting control module is connected to the first control line; and in the second pixel circuit, the control terminal of the first light-emitting control module is connected to the second control line, and the control terminal of the second light-emitting control module is connected to the second control line;

the bridge line comprises a seventh bridge line and an eighth bridge line;

in the first pixel circuit, the first light-emitting control module is connected to the drive transistor through the seventh bridge line, and the second light-emitting control module is connected to the drive transistor through the eighth bridge line; and along a direction perpendicular to a plane of the display panel, the seventh bridge line overlaps with the second control line in an insulated manner, and the eighth bridge line overlaps with the second control line in an insulated manner.

19. The display panel according to claim 1, further comprising a substrate, a semiconductor layer, a first metal layer, a second metal layer, and a third metal layer, wherein the semiconductor layer, the first metal layer, the second metal layer, and the third metal layer are arranged sequentially away from the substrate; and the drive transistor comprises an active layer located in the semiconductor layer, and a gate located in the first metal layer; the pixel circuit further comprises a storage capacitor; the storage capacitor comprises one electrode plate located in the first metal layer, and the other electrode plate located in the second metal layer; and the bridge line is located in the third metal layer.

20. A display apparatus, comprising a display panel, wherein the display panel, comprises pixel circuits and light-emitting devices, wherein one of the pixel circuits comprises a drive transistor, a first light-emitting control module, and a second light-emitting control module; one of the first light-emitting control module and the second light-emitting control module is connected between a first power terminal and a first electrode of the drive transistor, and the other of the first light-emitting control module and the second light-emitting control module is connected between a second electrode of the drive transistor and the light-emitting device;

the pixel circuits comprise a first pixel circuit and a second pixel circuit, and the display panel comprises a bridge line; and at least one of the first light-emitting control module and the second light-emitting control module in the first pixel circuit is connected to the drive transistor through the bridge line; and at least one of the first light-emitting control module and the second light-emitting control module in the second pixel circuit is directly connected to the drive transistor.

* * * * *